US012755904B2

(12) United States Patent
Fukuoka et al.

(10) Patent No.: US 12,755,904 B2
(45) Date of Patent: Oct. 6, 2026

(54) ELECTRONIC COMPONENT WITH SURFACE ELECTRODE LAYER

(71) Applicant: TDK CORPORATION, Tokyo (JP)

(72) Inventors: Tomohisa Fukuoka, Tokyo (JP); Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 146 days.

(21) Appl. No.: 18/609,537

(22) Filed: Mar. 19, 2024

(65) Prior Publication Data

US 2024/0321518 A1 Sep. 26, 2024

(30) Foreign Application Priority Data

Mar. 22, 2023 (JP) ................................ 2023-045456

(51) Int. Cl.

| | |
|---|---|
| ***H01G 4/232*** | (2006.01) |
| ***H01G 2/06*** | (2006.01) |
| ***H01G 4/008*** | (2006.01) |
| ***H01G 4/012*** | (2006.01) |
| ***H01G 4/30*** | (2006.01) |
| ***H01G 4/38*** | (2006.01) |

(52) U.S. Cl.

CPC ............. *H01G 4/232* (2013.01); *H01G 2/065* (2013.01); *H01G 4/008* (2013.01); *H01G 4/012* (2013.01); *H01G 4/30* (2013.01); *H01G 4/38* (2013.01)

(58) Field of Classification Search

CPC ........ H01G 4/232; H01G 2/065; H01G 4/008; H01G 4/012; H01G 4/30; H01G 4/2325; H01G 4/005

See application file for complete search history.

(56) References Cited

U.S. PATENT DOCUMENTS

2008/0081200 A1* 4/2008 Katsube .................. H01G 4/30 427/404
2014/0002952 A1* 1/2014 McConnell ............. H01G 4/30 29/25.42
2015/0364261 A1* 12/2015 Takahashi ........... H05K 3/3442 361/301.4
2016/0005539 A1* 1/2016 Lee ....................... H01G 4/232 156/89.12
2016/0049249 A1* 2/2016 Mukobata ............... H01G 4/30 361/301.4

(Continued)

FOREIGN PATENT DOCUMENTS

JP H08-264371 A 10/1996
JP 2020150070 A * 9/2020

*Primary Examiner* — Timothy J. Dole
(74) *Attorney, Agent, or Firm* — Oliff PLC

(57) ABSTRACT

An electronic component includes an element body portion and a terminal electrode portion formed. The terminal electrode portion includes a base electrode layer that is in direct contact with the end surface and a surface electrode layer that covers the base electrode layer and constitutes an outermost surface of the terminal electrode portion. A relation between a thickness T2 of the surface electrode layer and a thickness T4 of the surface electrode layer satisfies 1.3≤T4/T2≤15.0, while the T2 is along a second reference line parallel to the lower surface and passes through a height of three quarters of the entire element body portion from the lower surface, and the T4 is along a fourth reference line parallel to the lower surface and passes through a height of one quarter of the entire element body portion from the lower surface.

10 Claims, 11 Drawing Sheets

(56) References Cited

U.S. PATENT DOCUMENTS

| | | | | |
|---|---|---|---|---|
| 2021/0272754 | A1* | 9/2021 | Hsiao | H01G 4/012 |
| 2024/0282531 | A1* | 8/2024 | Kim | H01G 4/12 |
| 2024/0428994 | A1* | 12/2024 | Oyama | H01G 4/30 |

* cited by examiner

ELECTRONIC COMPONENT WITH SURFACE ELECTRODE LAYER

BACKGROUND OF THE INVENTION

Field of the Invention

The present invention relates to an electronic component and an electronic component structure formed by connecting a plurality of the electronic components.

Description of the Related Art

Electronic components in which terminal electrodes are formed on both end surfaces of a substantially rectangular ceramic element body are widely used. Such electronic components are suitable for surface mounting, and are also used in a variety of sizes, from a submillimeter order to a larger size.

Such chip-type electronic components are generally mounted on a substrate or the like by a reflow method. In addition, a technique has been proposed in which a surface layer having high wettability to solder melted at the time of reflow bonding is formed on a surface of a terminal electrode of an electronic component to increase a contact area between the solder and the terminal electrode.

[Patent Document 1] JP Patent Application Laid Open No. H8-264371

SUMMARY OF THE INVENTION

In an electronic component according to the related art in which a surface layer having high wettability to solder is formed on a surface of a terminal electrode, there is a problem that excessive wetting up of solder to the terminal electrode occurs at the time of reflow, leading to a mounting failure.

The present disclosure has been made in view of such circumstances, and provides an electronic component and an electronic component structure capable of preventing excessive wetting up of solder to a terminal electrode at the time of reflow.

In order to achieve the above-mentioned object, the electronic component according to the present disclosure includes:

an element body portion having a substantially rectangular parallelepiped shape, and a terminal electrode portion formed on each of a pair of end surfaces of the element body portion, in which the terminal electrode portion includes a base electrode layer that is in direct contact with the end surface and a surface electrode layer that covers the base electrode layer and constitutes an outermost surface of the terminal electrode portion, and in a cross section passing through a center of the element body portion and perpendicular to an element body lower surface and the end surface of the element body portion, a relation between a thickness T2 of the surface electrode layer and a thickness T4 of the surface electrode layer satisfies 1.3≤T4/T2≤15.0, the thickness T2 being along a second reference line that is parallel to the element body lower surface and passes through a height of three quarters of the entire element body portion from the element body lower surface, and the thickness T4 being along a fourth reference line that is parallel to the element body lower surface and passes through a height of one quarter of the entire element body portion from the element body lower surface.

In such an electronic component according to the present disclosure, a thickness of the surface electrode layer changes in accordance with a height from the lower surface, and the relation between the thickness T2 along the second reference line above the element body lower surface and the thickness T4 along the fourth reference line below the element body lower surface is within a predetermined range. Accordingly, the electronic component according to the present disclosure can form a solder fillet having an appropriate shape to exhibit reliable bonding strength with respect to a mounting land, and can prevent excessive wetting up of solder. In addition, since a thickness of the surface electrode layer in the vicinity of the second reference line can be reduced, a usage amount of a metal material which is a limited resource can be suppressed, and a material cost can also be reduced.

For example, the surface electrode layer may contain Sn or Au.

Such a surface electrode layer has particularly good wettability to solder, and can suitably suppress an occurrence of mounting failure.

For example, the surface electrode layer may contain Sn, and the relation between the thickness T2 of the surface electrode layer along the second reference line and the thickness T4 of the surface electrode layer along the fourth reference line may satisfy 2.5≤T4/T2≤15.0.

For example, the surface electrode layer may contain Au, and the relation between the thickness T2 of the surface electrode layer along the second reference line and the thickness T4 of the surface electrode layer along the fourth reference line may satisfy 2.5≤T4/T2≤8.0.

With such an electronic component, excessive wetting up of solder can be more suitably prevented, and good mountability by reflow soldering is exhibited.

In addition, the electronic component structure according to the present disclosure includes: a plurality of electronic components each including an element body portion having a substantially rectangular parallelepiped shape, and a terminal electrode portion formed on each of a pair of end surfaces of the element body portion, the terminal electrode portions of the respective electronic components being connected to each other, in which at least one of the plurality of electronic components is a first-stage electronic component having an element body lower surface that does not face other electronic components, and in the first-stage electronic component, the terminal electrode portion includes a base electrode layer that is in direct contact with the end surface and a surface electrode layer that covers the base electrode layer and constitutes an outermost surface of the terminal electrode portion, and in a cross section passing through a center of the element body portion and perpendicular to an element body lower surface and the end surface of the element body portion, a relation between a thickness T2 of the surface electrode layer and a thickness T4 of the surface electrode layer satisfies 1.3≤T4/T2≤15.0, the thickness T2 being along a second reference line that is parallel to the element body lower surface and passes through a height of three quarters of the entire element body portion from the element body lower surface, and the thickness T4 being along a fourth reference line that is parallel to the element body lower surface and passes through a height of one quarter of the entire element body portion from the element body lower surface.

In the first-stage electronic component in the electronic component structure according to the present disclosure, a thickness of the surface electrode layer changes in accordance with a height from the lower surface, and the relation between the thickness T2 along the second reference line above the element body lower surface and the thickness T4 along the fourth reference line below the element body lower surface is within a predetermined range. Accordingly, the electronic component structure according to the present disclosure can form a fillet having an appropriate shape to exhibit reliable bondability to a mounting land, and can prevent excessive wetting up of solder. In addition, since a thickness of the surface electrode layer in the vicinity of the second reference line can be reduced, a usage amount of a metal material which is a limited resource can be suppressed, and a material cost can also be reduced. Further, since the center of gravity of the first-stage electronic component is lowered, the electronic component structure can be prevented from collapsing during mounting or after mounting.

For example, at least one of the plurality of electronic components is a second-stage electronic component having an element body lower surface facing an element body upper surface of the first-stage electronic component, the terminal electrode portion in the second-stage electronic component may include a base electrode layer that is in direct contact with the end surface and a surface electrode layer that covers the base electrode layer and constitutes an outermost surface of the terminal electrode portion, and in a cross section passing through a center of the element body portion in the second-stage electronic component and perpendicular to the element body lower surface and the end surface of the element body portion, a relation between a thickness T42 of the surface electrode layer and the thickness T2 of the surface electrode layer may satisfy $1.3 \le T42/T2 \le 32$, the thickness T42 being along the fourth reference line that is parallel to the element body lower surface and passes through a height of one quarter of the entire element body portion from the element body lower surface, and the thickness T2 being along the second reference line in the first-stage electronic component.

Such an electronic component structure can prevent excessive wetting up of solder of the first-stage electronic component, and can appropriately ensure bonding strength between the first-stage electronic component and the second-stage electronic component. In addition, it is possible to suitably prevent a problem that a short circuit failure occurs accompanying excessive wetting up of solder at a bonding portion between the first-stage electronic component and the second-stage electronic component.

For example, at least one of the plurality of electronic components is an nth-stage electronic component having an element body lower surface facing any one of other electronic components, and in the nth-stage electronic component, the terminal electrode portion may include a base electrode layer that is in direct contact with the end surface and a surface electrode layer that covers the base electrode layer and constitutes an outermost surface of the terminal electrode portion, and in a cross section passing through a center of the element body portion and perpendicular to the element body lower surface and the end surface of the element body portion, a relation between a thickness T2n of the surface electrode layer and a thickness T4n of the surface electrode layer may satisfy $1.3 \le T4n/T2n \le 15.0$, the thickness T2n being along the second reference line that is parallel to the element body lower surface and passes through a height of three quarters of the entire element body portion from the element body lower surface, and the thickness T4n being along the fourth reference line that is parallel to the element body lower surface and passes through a height of one quarter of the entire element body portion from the element body lower surface.

In such an electronic component structure, since the center of gravity of the nth-stage electronic component is low, it is easy to stably install the nth-stage electronic component on another electronic component, a bonding process of the electronic components can be smoothly performed, resulting in good productivity.

For example, all electronic components other than the first-stage electronic component among the plurality of electronic components may be the nth-stage electronic components.

In such an electronic component structure, each of the electronic components exhibits good bonding strength.

For example, another one of the plurality of electronic components is an uppermost-stage electronic component having an element body upper surface that does not face other electronic components, the terminal electrode portion in the uppermost-stage electronic component may include a base electrode layer that is in direct contact with the end surface and a surface electrode layer that covers the base electrode layer and constitutes an outermost surface of the terminal electrode portion, and in a cross section passing through a center of the element body portion in the uppermost-stage electronic component and perpendicular to the element body lower surface and the end surface of the element body portion, a relation between a thickness T2max of the surface electrode layer and the thickness T4 of the surface electrode layer may satisfy $T2max \le T4$, the thickness T2max being along the second reference line that is parallel to the element body lower surface and passes through a height of one quarter of the entire element body portion from the element body lower surface, and the thickness T4 being along the fourth reference line in the first-stage electronic component.

In such an electronic component structure, since the center of gravity of the entire electronic component structure is lowered, it is possible to suitably prevent a problem of collapse during mounting or after mounting.

DETAILED DESCRIPTION OF THE PREFERRED EMBODIMENTS

First Embodiment

Figure 1:
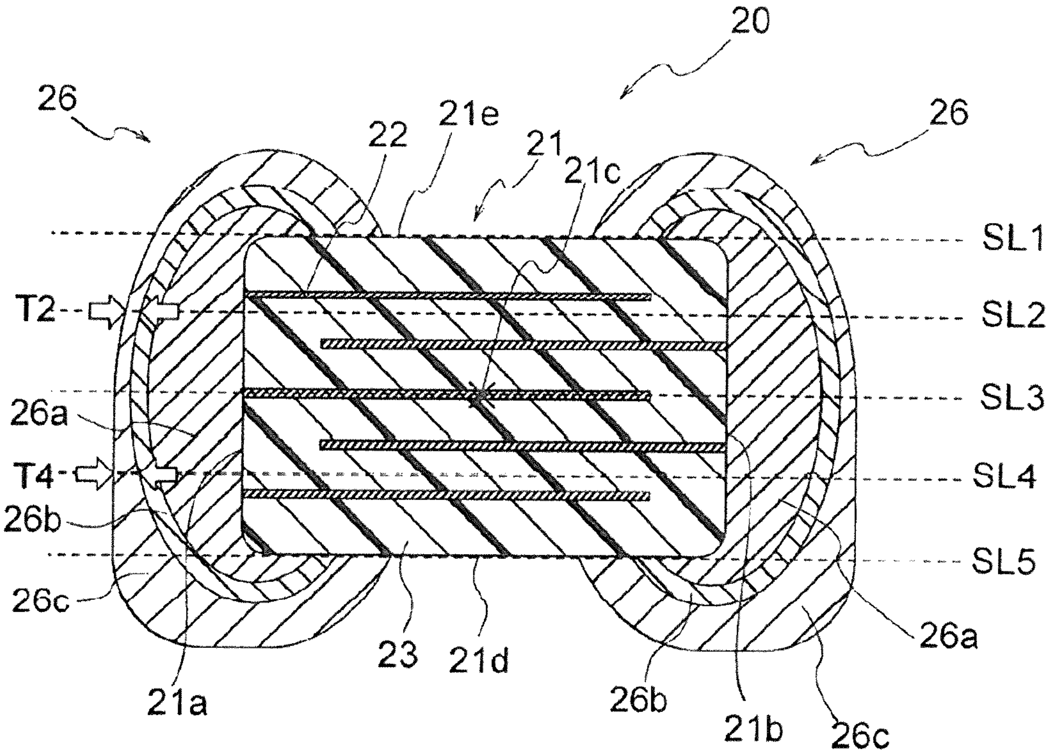
FIG. 1 is a schematic cross-sectional view illustrating an electronic component according to a first embodiment of the present disclosure.

FIG. 1 is a schematic cross-sectional view illustrating an electronic component 20 according to a first embodiment. As illustrated in FIG. 1, the electronic component 20 includes an element body portion 21 having a rectangular parallelepiped shape, and terminal electrode portions 26 formed on a pair of end surfaces 21*a* and 21*b* of the element body portion 21, respectively. FIG. 1 is a cross-sectional view taken along a cross section passing through a center 21*c* of the element body portion 21 and perpendicular to an element body lower surface 21*d* and the end surfaces 21*a* and 21*b* of the element body portion 21.

A size of the electronic component 20 is not particularly limited, and examples thereof include JIS and EIA standard sizes having a length of about 0.4 mm to 6.4 mm and a width of about 0.2 mm to 3.2 mm. The same applies to electronic components 20 according to other embodiments. Cross-sectional views illustrated in the present disclosure are schematic views for illustration, and some of ratios of respective portions are different from actual dimensions.

As illustrated in FIG. 1, the terminal electrode portions 26 cover the end surfaces 21*a* and 21*b* of the element body portion 21 having a substantially rectangular parallelepiped shape, and are formed so as to spread over a part of other side surfaces adjacent to the end surfaces 21*a* and 21*b*. The pair of terminal electrode portions 26 are formed on a surface of the element body portion 21 so as to be separated from each other, and with respect to one of the terminal electrode portions 26 formed on the end surface 21*a*, the other of the terminal electrode portions 26 formed on the end surface 21*b* is electrically insulated therefrom.

The electronic component 20 illustrated in FIG. 1 is a chip capacitor. As illustrated in FIG. 1, dielectric layers 23 and internal electrode layers 22 are alternately stacked inside the element body portion 21. A stacking direction of the dielectric layers 23 and the internal electrode layers 22 is an up-down direction, but alternatively, the stacking direction may be perpendicular to the up-down direction of the electronic component 20. As will be described later, the electronic component 20 is vertically asymmetric particularly with respect to a cross-sectional shape of the terminal electrode portion 26.

A material of the dielectric layer 23 is not particularly limited, and the dielectric layer is made of a dielectric material such as calcium titanate, strontium titanate, barium titanate, calcium zirconate, strontium zirconate, calcium strontium zirconate, or a mixture thereof. A thickness of each dielectric layer 23 is not particularly limited, and is generally 1 μm to several hundred micrometers. In the present embodiment, the thickness of each dielectric layer 23 is preferably 1.0 μm to 5.0 μm.

The internal electrode layer 22 inside the element body portion 21 contains a conductor material. The conductor material contained in the internal electrode layer 22 is not particularly limited, and in a case where a constituent material of the dielectric layer 23 has reduction resistance, a relatively inexpensive base metal can be used. The base metal used for the internal electrode layer 22 is preferably Ni or a Ni alloy. The Ni alloy is preferably an alloy of Ni and one or more elements selected from Cu, Sn, Mn, Cr, and Al, and a Ni content in the alloy is preferably 95% by weight or more. Ni or the Ni alloy may contain various trace components such as P in an amount of about 0.1% by weight or less. In addition, the internal electrode layer 22 may be formed using a general-purpose electrode paste. A thickness of the internal electrode layer 22 may be appropriately determined according to an application or the like. In addition, the internal electrode layer 22 may be formed of a conductive material other than a metal.

The internal electrode layers 22 stacked inside the element body portion 21 include those connected to one of the terminal electrode portions 26 (formed on the end surface 21*a* of the element body portion 21 in FIG. 1) and those connected to the other of the terminal electrode portions 26 (formed on the end surface 21*b* of the element body portion 21 in FIG. 1). A potential difference applied between the pair of terminal electrode portions 26 is applied to the dielectric layers 23 disposed between the internal electrode layers 22 via the internal electrode layers 22.

As illustrated in FIG. 1, the terminal electrode portion 26 includes a base electrode layer 26*a* that is in direct contact with the end surface 21*a* of the element body portion 21, and a surface electrode layer 26*c* that covers at least a portion (preferably the entire portion) of the base electrode layer 26*a* and constitutes an outermost surface of the terminal electrode portion 26. In addition, the terminal electrode portion 26 includes an intermediate electrode layer 26*b* sandwiched between the surface electrode layer 26*c* and the base electrode layer 26*a*, and has a three-layered structure including the surface electrode layer 26*c*, the intermediate electrode layer 26*b*, and the base electrode layer 26*a* from an outermost surface side.

Regarding the terminal electrode portions 26 of the electronic component 20, the one formed on the end surface 21*a* and the one formed on the end surface 21*b* have the same characteristics except that left and right arrangements thereof are different. Therefore, regarding the terminal electrode portions 26, the one formed on the end surface 21*a* will be described as an example, and the description of the one formed on the end surface 21*b* will be omitted.

The base electrode layer 26*a* includes, for example, a baked electrode formed by baking. Examples of a material of the base electrode layer 26*a* include Cu and a Cu alloy, Ag and an Ag alloy, but other metals may be used. Examples of a material of the intermediate electrode layer 26*b* include Ni and a Ni alloy, Pd and a Pd alloy.

The intermediate electrode layer 26*b* is formed by a method such as wet plating, but may be formed by other methods. In addition, the terminal electrode portion 26 illustrated in FIG. 1 has the three-layered structure including the intermediate electrode layer 26*b*, but the terminal electrode portion 26 is not limited thereto, and may have a two-layered structure in which the intermediate electrode layer 26*b* is omitted, or may have a structure of four or more layers including a plurality of the intermediate electrode layers 26*b*. The same applies to terminal electrodes of other embodiments.

The surface electrode layer 26*c* is formed above the base electrode layer 26*a* and covers the base electrode layer 26*a*. The surface electrode layer 26*c* is preferably made of a material that forms a surface having higher wettability to molten solder than that of the base electrode layer 26*a* and the intermediate electrode layer 26*b*. A material of the surface electrode layer 26*c* may include Sn and a Sn alloy, Au and an Au alloy, Pd and a Pd alloy, or the like, and the surface electrode layer 26*c* may contain, in addition to a metal alone containing Sn, Au, and Pd or a solid solution, an intermetallic compound of these metals and the metals contained in the intermediate electrode layer 26*b*. For example, the surface electrode layer 26*c* may contain a solid solution such as Sn—Pb, Sn—Cu, Sn—Bi, Sn—Ni, Au—Sn, Au—Ni, or the like, or an intermetallic compound.

As illustrated in FIG. 1, in a cross section passing through the center 21*c* of the element body portion 21 and perpendicular to the element body lower surface 21*d* and the end surfaces 21*a* and 21*b* of the element body portion 21, a cross-sectional shape of the terminal electrode portion 26 is asymmetric with respect to a third reference line SL3 that is parallel to the element body lower surface 21*d* and passes through the center 21*c* of the element body portion 21. In particular, a thickness of the surface electrode layer 26*c* in the terminal electrode portion 26 is different between a portion above the third reference line SL3 and a portion below the third reference line SL3.

In addition, a relation between a thickness T2 of the surface electrode layer 26*c* and a thickness T4 of the surface electrode layer 26*c* satisfies the following equation (1), the thickness T2 being along a second reference line SL2 that is parallel to the element body lower surface 21*d* and passes through a height of three quarters of the entire element body portion 21 from the element body lower surface 21*d*, and the thickness T4 being along a fourth reference line SL4 that is parallel to the element body lower surface 21*d* and passes through a height of one quarter of the entire element body portion 21 from the element body lower surface 21*d*.

$$1.3 \leq T4/T2 \leq 15.0 \qquad \text{Equation (1)}$$

That is, the thickness T2 of the surface electrode layer 26*c* along the second reference line SL2 that passes above the center 21*c* of the element body portion 21 is smaller than the thickness T4 of the surface electrode layer 26*c* along the fourth reference line SL4 that passes through a symmetrical height with respect to a third reference line SL3 passing through the center 21*c* of the element body portion 21. A first reference line SL1 illustrated in FIG. 1 is a reference line having the same height as that of an element body upper surface 21*e*, and a fifth reference line SL5 is a reference line having the same height as that of the element body lower surface 21*d*.

Figure 2:
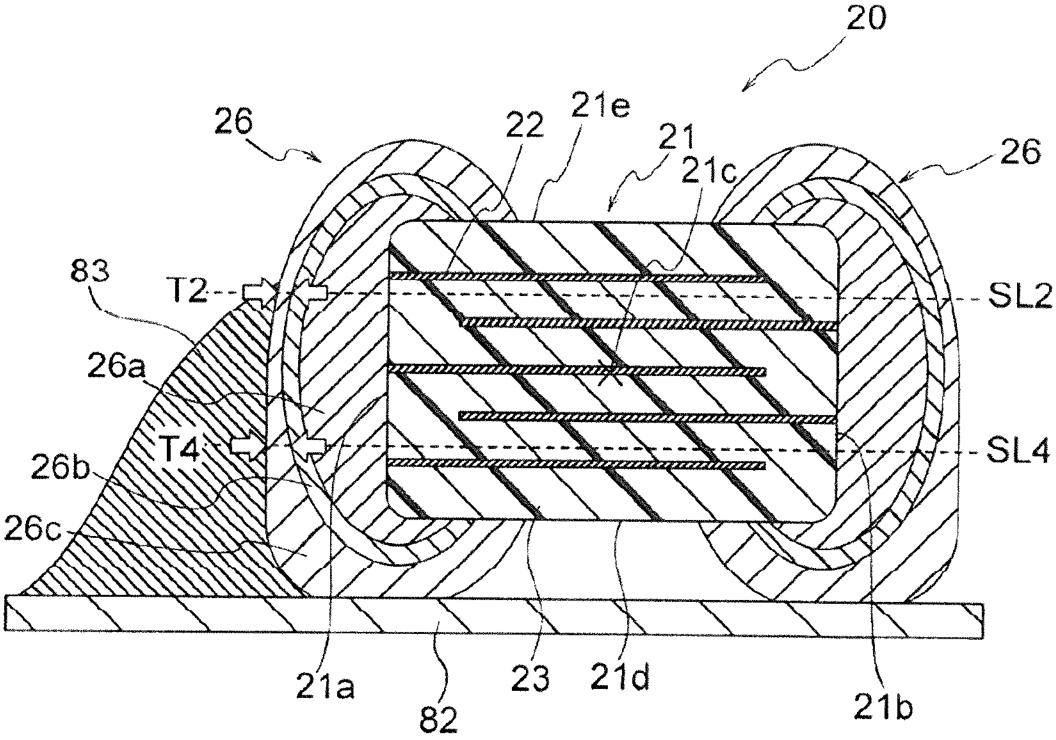
FIG. 2 is a conceptual view illustrating the electronic component illustrated in FIG. 1 and a formation state of a solder fillet on the electronic component.

FIG. 2 is a conceptual view illustrating a formation state of a solder fillet 83 formed on the terminal electrode portion 26 and a land of a mounting substrate 82 in a case where the electronic component 20 illustrated in FIG. 1 is mounted on the mounting substrate 82 by a reflow method. In FIG. 2, among solder fillets, only the solder fillet 83 formed on the terminal electrode portion 26 on an end surface 21*a* side is schematically illustrated. As illustrated in FIG. 2, in the terminal electrode portion 26, since the thickness T4 of the surface electrode layer 26*c* along the fourth reference line SL4 is large, solder wets up to a lower side of the terminal electrode portion 26, and since the thickness T2 of the surface electrode layer 26*c* along the second reference line SL2 is small, the solder is prevented from wetting up to an upper side of the terminal electrode portion 26. As described above, the electronic component 20 can form a fillet having an appropriate shape exceeding the height of the fourth reference line SL4 to exhibit reliable bondability to a mounting land, and can prevent wetting up of solder exceeding the second reference line SL2.

Figure 3:
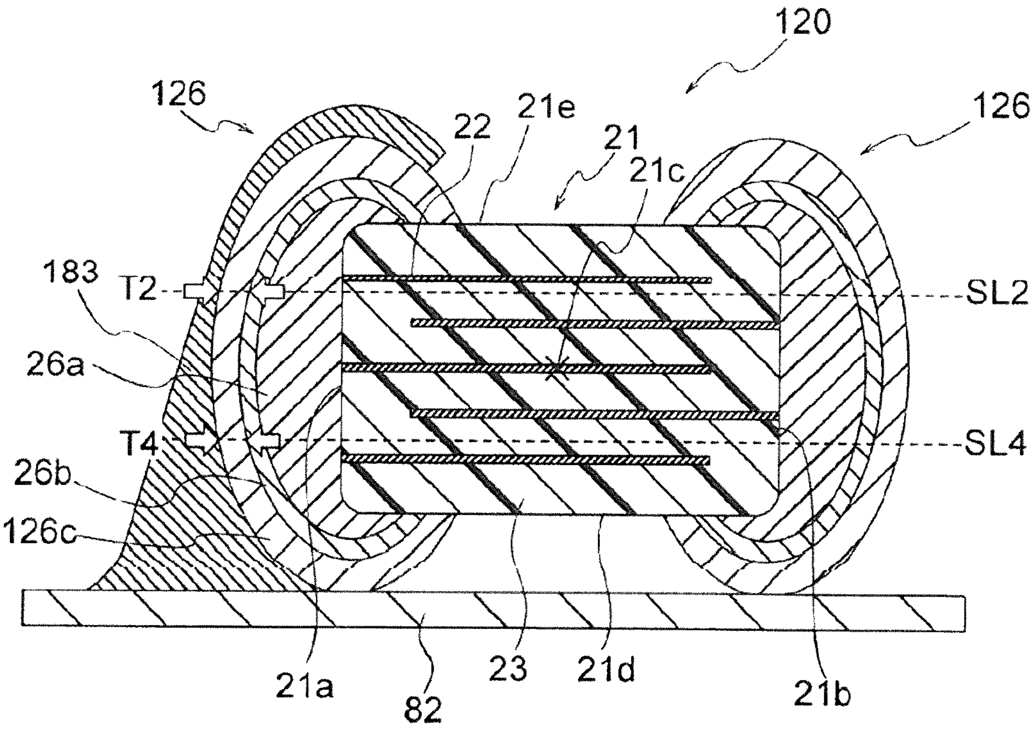
FIG. 3 is a conceptual view illustrating an electronic component according to a first comparative example and a formation state of a solder fillet on the electronic component.

In contrast, FIG. 3 is a conceptual view illustrating a formation state of a solder fillet 183 formed on a terminal electrode portion 126 and the land of the mounting substrate 82 in a case where an electronic component 120 according to a first comparative example is mounted on the mounting substrate 82 by the reflow method. In the electronic component 120, a cross-sectional shape of the terminal electrode portion 126 is substantially symmetrical with respect to the third reference line SL3 passing through the center 21*c* of the element body portion 21, and a thickness of a surface electrode layer 126*c* along the second reference line SL2 is substantially the same as a thickness of the surface electrode layer 126*c* along the fourth reference line SL4.

As illustrated in FIG. 3, in the electronic component 120 according to the first comparative example, since the thickness of the surface electrode layer 126*c* formed in the terminal electrode portion 126 is substantially constant in a height direction, excessive wetting up of solder exceeding the element body upper surface 21*e* of the element body portion 21 and a vertex of the terminal electrode portion 126 may occur. Formation of the solder fillet 183 showing the excessive wetting up of solder as illustrated in FIG. 3 may lead to a crack or a short circuit failure of the electronic component, which is not preferable.

As can be understood from the equation (1), it is preferable that the thickness T4 of the surface electrode layer 26*c* along the fourth reference line SL4 does not become excessively large over a predetermined value (T4/T2=15) with respect to the thickness T2 of the surface electrode layer 26*c* along the second reference line SL2. By setting T4/T2 to be equal to or less than the predetermined value, it is possible to prevent a projected area of the electronic component 20 onto a substrate from being excessively increased and to maintain a high mounting density. In addition, it is also possible to suitably prevent an occurrence of a short circuit failure at the element body lower surface 21*d*.

The surface electrode layer 26*c* having a shape feature as illustrated in FIGS. 1 and 2 preferably contains Sn or Au. Since the surface electrode layer 26*c* having such a metal exhibits suitable wettability with respect to molten solder, the surface electrode layer 26*c* forms a fillet having an appropriate shape and exhibits reliable bonding strength with respect to the mounting land by a mounting process of the reflow method. The wettability between the solder and the surface electrode layer 26*c* is measured based on a contact angle or the like.

In a case where the surface electrode layer 26*c* contains Sn, the relation between the thickness T2 of the surface electrode layer 26*c* along the second reference line SL2 and the thickness T4 of the surface electrode layer 26*c* along the fourth reference line SL4 preferably satisfies the following expression (2).

$$2.5 \leq T4/T2 \leq 15.0 \quad \text{Equation (2)}$$

In addition to the material of the surface electrode layer 26*c*, by setting a numerical range of T4/T2 within a narrower range, excessive wetting up of reflow solder is suitably prevented, and a fillet having an appropriate shape is formed to exhibit reliable bonding strength with respect to the mounting land.

In addition, in a case where the surface electrode layer 26*c* contains Au, the relation between the thickness T2 of the surface electrode layer 26*c* along the second reference line SL2 and the thickness T4 of the surface electrode layer 26*c* along the fourth reference line SL4 also preferably satisfies the following expression (3) for the same reason as described above.

$$2.5 \leq T4/T2 \leq 8.0 \quad \text{Equation (3)}$$

The surface electrode layer 26*c* having a shape as illustrated in FIG. 1 can be manufactured by, for example, forming the surface electrode layer 26*c* in two separate processes. For example, an intermediate product in which the base electrode layer 26*a* and the intermediate electrode layer 26*b* are formed on the element body portion 21 is prepared, and the intermediate product is subjected to electroplating by a barrel method to form a part (first stage) of the surface electrode layer 26*c* having a substantially uniform thickness (thickness T2) so as to cover the intermediate electrode layer 26*b*.

Next, only a portion of the part of the surface electrode layer 26*c* having a substantially uniform thickness below the third reference line SL3 is immersed in a plating solution and subjected to partial electroplating, thereby increasing the thickness of the surface electrode layer 26*c* below the third reference line SL3 to obtain the electronic component 20 having the surface electrode layer 26*c* as illustrated in FIG. 1.

In addition to such a method, for example, it is also possible to form a non-symmetrical surface electrode layer 26*c* as illustrated in FIG. 1 by forming a surface electrode layer having a uniform thickness with only a shape different from that of FIG. 1 on an outer side of the intermediate electrode layer 26*b*, and then placing the surface electrode layer into a non-oxidizing atmosphere ($N_2$, formic acid, $H_2$, or the like) in a mounting posture and performing a heat treatment to melt and deform the surface electrode layer.

Figure 4:
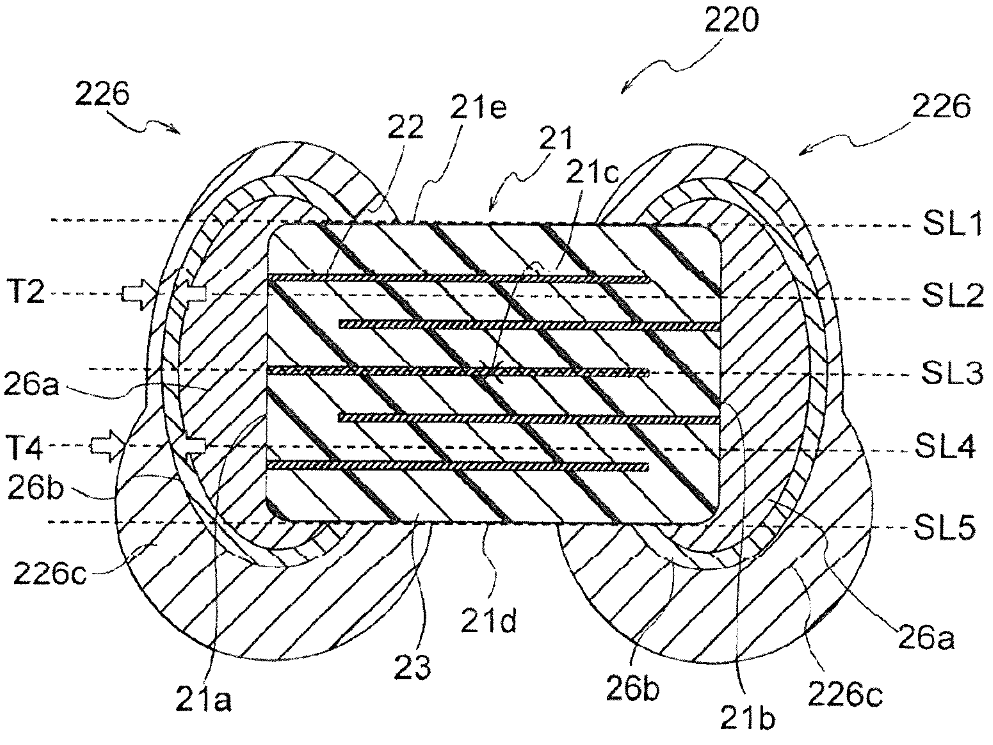
FIG. 4 is a schematic cross-sectional view illustrating an electronic component according to a first modification.

As described above, the electronic component 20 according to the present disclosure has been described with reference to the embodiments, but the technical scope of the electronic component according to the present disclosure is not limited to the above-described embodiments, and it is needless to say that the electronic component includes many other embodiments and modifications. For example, FIG. 4 is a schematic cross-sectional view illustrating an electronic component 220 according to a first modification. The electronic component 220 is different from the electronic component 20 illustrated in FIG. 1 only in a shape of a surface electrode layer 226*c*, but characteristics other than the shape of the surface electrode layer 226*c* are the same as those of the electronic component 20. Regarding the electronic component 220, only the shape of the surface electrode layer 226*c* will be described, and descriptions of points common to those of the electronic component 20 will be omitted.

As illustrated in FIG. 4, a terminal electrode portion 226 of the electronic component 220 has a substantially arc-shaped contour shape at a portion below a fifth reference line SL5, and is different from the terminal electrode portion 26 (see FIG. 1) having a flat bottom portion. However, similarly to the electronic component 20, in the electronic component 220, a relation between a thickness T2 of a surface electrode layer 226*c* along the second reference line SL2 and a thickness T4 of the surface electrode layer 226*c* along the fourth reference line SL4 satisfies the expression (1).

In the terminal electrode portion 226 of the electronic component 220, the contour shape of the lower portion is a substantially arc shape, and a gap formed between the terminal electrode portion 226 and the land of the mounting substrate is large, and also in this respect, an effect of preventing excessive wetting up of solder is exhibited. In addition, the electronic component 220 exhibits the same effect as that of the electronic component 20 in the points common to the electronic component 20.

Figure 5:
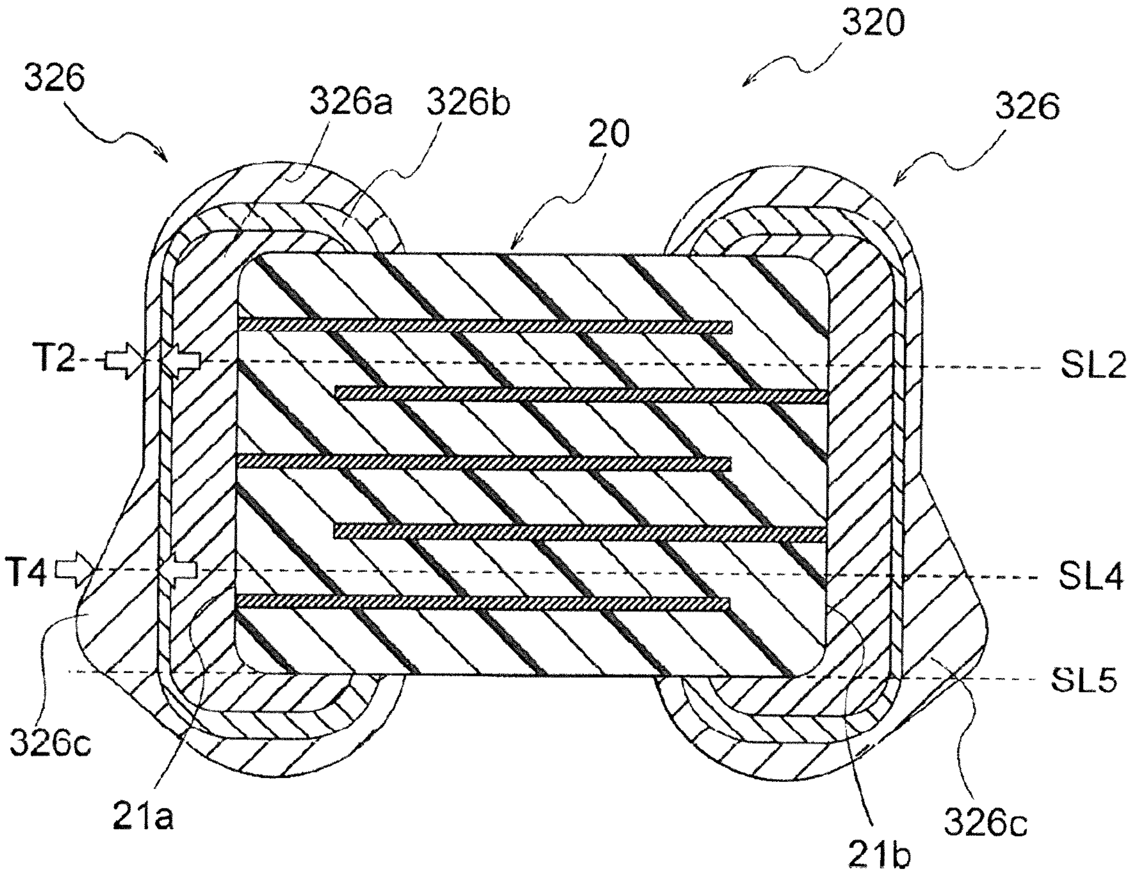
FIG. 5 is a schematic cross-sectional view illustrating an electronic component according to a second modification.

FIG. 5 is a schematic cross-sectional view illustrating an electronic component 320 according to a second modification. The electronic component 320 is different from the electronic component 20 illustrated in FIG. 1 only in shapes of a base electrode layer 326*a*, an intermediate electrode layer 326*b*, and a surface electrode layer 326*c* forming a terminal electrode portion 326, but characteristics other than the shape of the terminal electrode portion 326 are the same as those of the electronic component 20. Regarding the electronic component 320, only the shape of the terminal electrode portion 326 will be described, and descriptions of points common to those of the electronic component 20 will be omitted.

As illustrated in FIG. 5, the base electrode layer 326*a* of the electronic component 320 includes a linear outer peripheral portion extending in the up-down direction along the end surfaces 21*a* and 21*b* of the element body portion 21 and an arc-shaped outer peripheral portion connected to the linear outer peripheral portion, and is different from the base electrode layer 26*a* (see FIG. 1) including a substantially elliptical outer peripheral portion. The intermediate electrode layer 326*b* covering the base electrode layer 326*a* is formed along an outer peripheral shape of the base electrode layer 326*a*, and has a substantially constant thickness in a portion in contact with the linear outer peripheral portion of the base electrode layer 326*a*.

A thickness of the surface electrode layer 326*c* covering the base electrode layer 326*a* and the intermediate electrode layer 326*b* changes in a portion extending in the up-down direction. That is, a thickness of the surface electrode layer 326*c* is maximized between the fourth reference line SL4 and the fifth reference line SL5 in the height direction. Similarly to the surface electrode layer 26*c*, in the surface electrode layer 326*c*, a relation between a thickness T2 of the surface electrode layer 326*c* along the second reference line SL2 and a thickness T4 of the surface electrode layer 326*c* along the fourth reference line SL4 satisfies the expression (1).

An outer peripheral shape of the terminal electrode portion 326 of the electronic component 320 has many portions parallel to an outer peripheral shape of the element body portion 21, and the electronic component 320 can suppress an average thickness of the terminal electrode portion 326. In addition, the electronic component 320 exhibits the same effect as that of the electronic component 20 in the points common to the electronic component 20.

Figure 6A:
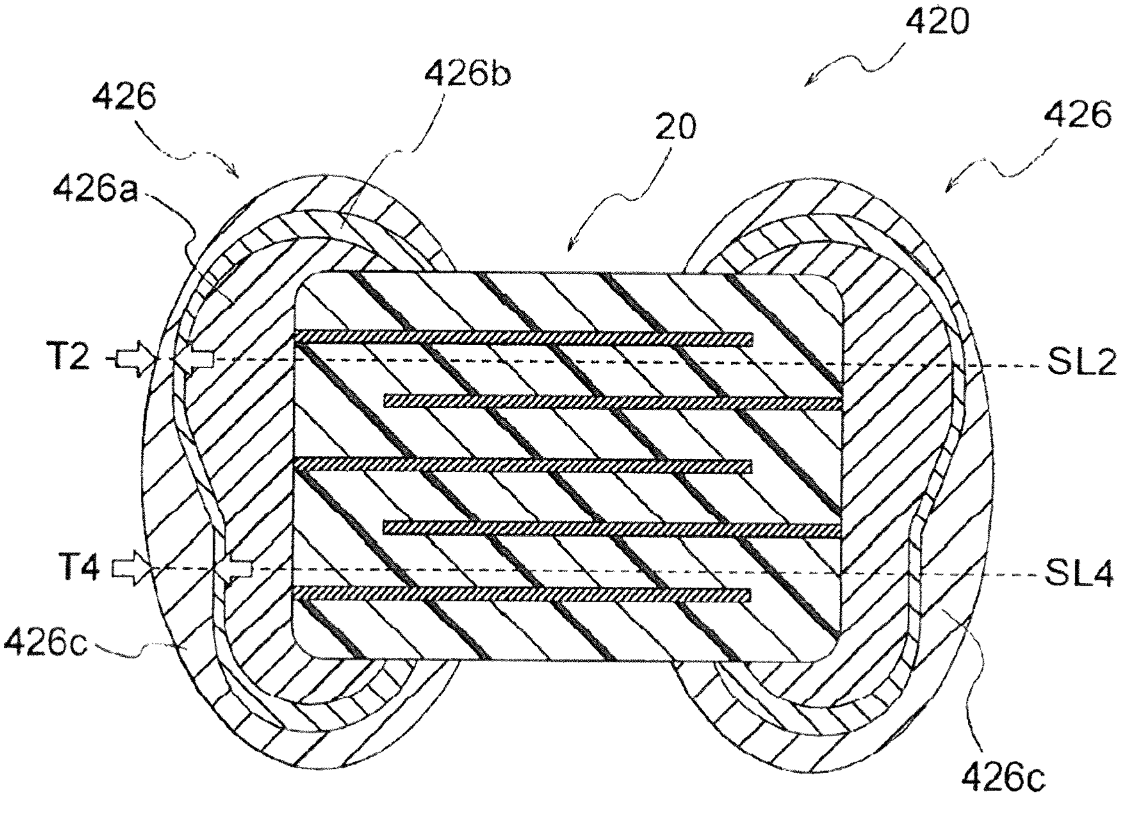
FIG. 6A is a schematic cross-sectional view illustrating an electronic component according to a third modification.
Figure 6B:
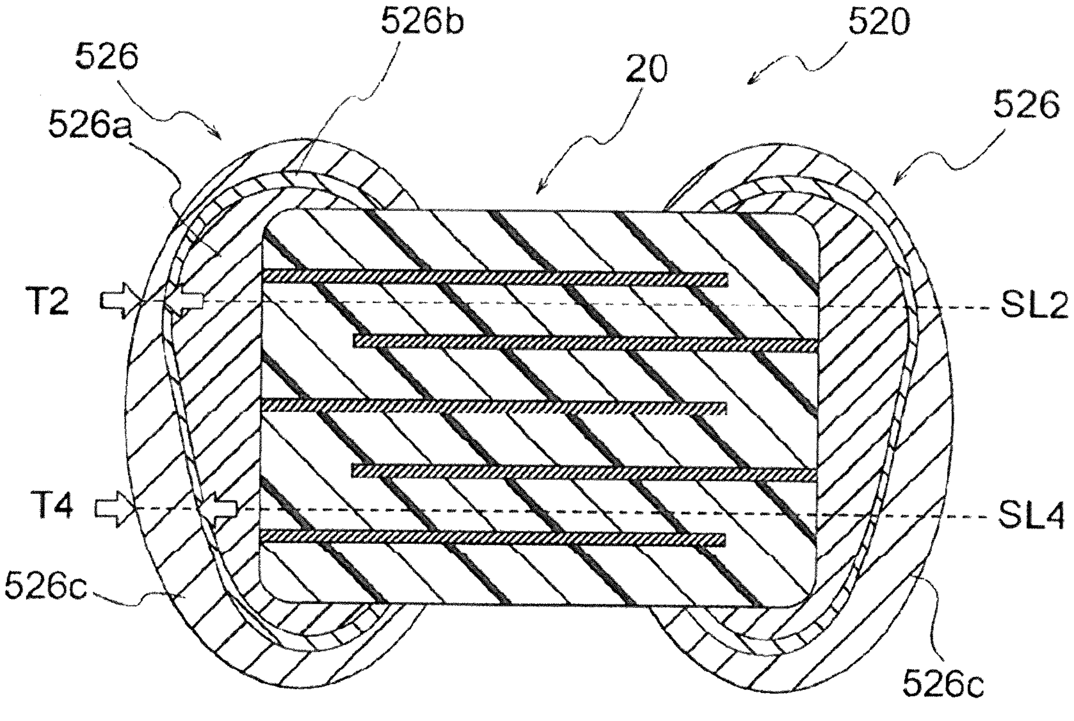
FIG. 6B is a schematic cross-sectional view illustrating an electronic component according to a fourth modification.

FIGS. 6A and 6B are schematic cross-sectional views illustrating electronic components 420 and 520 according to a third modification and a fourth modification, respectively. The electronic components 420 and 520 are different from the electronic component 20 illustrated in FIG. 1 only in shapes of base electrode layers 426*a* and 526*a*, intermediate electrode layers 426*b* and 526*b*, and surface electrode layers 426*c* and 526*c* forming terminal electrode portions 426 and 526, but characteristics other than the shapes of the terminal electrode portions 426 and 526 are the same as those of the electronic component 20. Regarding the electronic components 420 and 520, only the shapes of the terminal electrode portions 426 and 526 will be described, and descriptions of points common to the electronic component 20 will be omitted.

As illustrated in FIG. 6A and FIG. 6B, cross-sectional shapes of the base electrode layers 426*a* and 526*a* of the electronic components 420 and 520 are vertically asymmetric. That is, regarding thicknesses of the base electrode layers 426*a* and 526*a*, a thickness T2 along the second reference line SL2 is larger than a thickness along the fourth reference line SL4. The intermediate electrode layers 426*b* and 526*b* covering the base electrode layers 426*a* and 526*a* are formed along outer peripheral shapes of the base electrode layers 426*a* and 526*a*, and outer peripheral shapes of the intermediate electrode layers 426*b* and 526*b* are shapes close to linear outer peripheral shapes of the base electrode layers 426*a* and 526*a*.

The surface electrode layers 426*c* and 526*c* covering the base electrode layers 426*a* and 526*a* and the intermediate electrode layers 426*b* and 526*b* have an elliptical outer peripheral shape, and do not extend along the outer peripheral shapes of the base electrode layers 426*a* and 526*a* and the intermediate electrode layers 426*b* and 526*b*. That is, the surface electrode layers 426*c* and 526*c* are thin at a height of the second reference line SL2 where the thicknesses of the base electrode layers 426*a* and 526*a* are large, and are thick at a height of the fourth reference line SL4 where the thicknesses of the base electrode layers 426*a* and 526*a* are small. Similarly to the surface electrode layer 26*c*, in the surface electrode layers 426*c* and 526*c*, the relation between the thickness T2 of the surface electrode layers 426*c* and 526*c* along the second reference line SL2 and the thickness T4 of the surface electrode layers 426*c* and 526*c* along the fourth reference line SL4 satisfies the expression (1).

In the terminal electrode portions 426 and 526 of the electronic components 420 and 520, the cross-sectional shapes of the base electrode layers 426*a* and 526*a* are vertically asymmetric, the surface electrode layers 426*c* and 526*c* are thin at portions where the base electrode layers 426*a* and 526*a* are thick, and the surface electrode layers 426*c* and 526*c* are thick at portions where the base electrode layers 426*a* and 526*a* are thin. Accordingly, in the electronic components 420 and 520, outermost surfaces of the terminal electrode portions 426 and 526 have smooth arc shapes. In addition, the electronic components 420 and 520 exhibit the same effect as that of the electronic component 20 in the points common to the electronic component 20.

Second Embodiment

Figure 7:
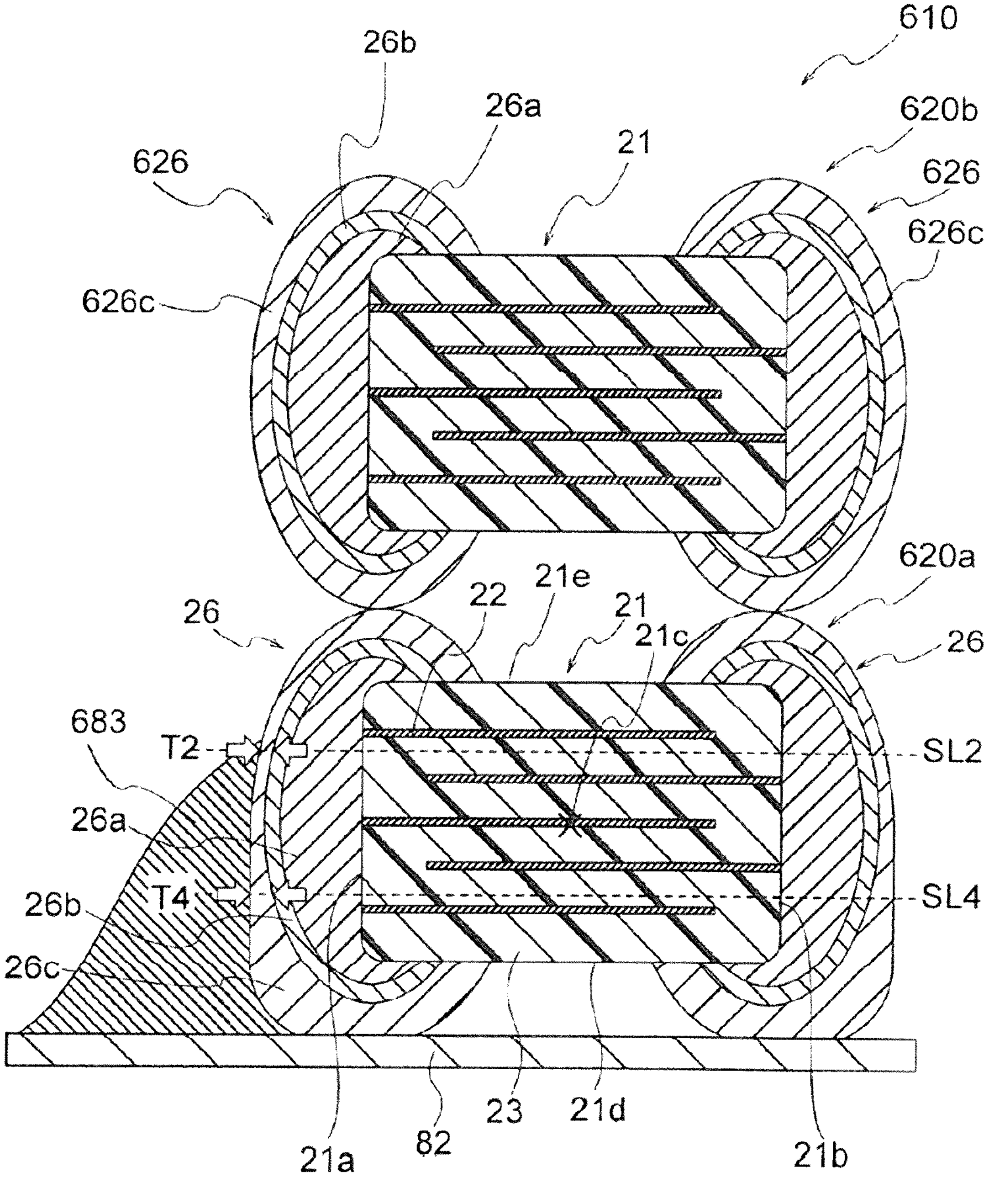
FIG. 7 is a schematic cross-sectional view illustrating an electronic component structure according to a second embodiment of the present disclosure and a formation state of a solder fillet on the electronic component structure.

FIG. 7 is a schematic cross-sectional view of an electronic component structure 610 according to a second embodiment of the present disclosure. The electronic component structure 610 includes a plurality of (two in FIG. 7) electronic components (first-stage electronic component 620*a* and second-stage electronic component 620*b*) each including an element body portion 21 having a substantially rectangular parallelepiped shape and terminal electrode portions 26 and 626 formed on a pair of end surfaces 21*a* and 21*b* of the element body portion 21, respectively, and the electronic components 620*a* and 620*b* are connected to each other.

In the electronic component structure 610, one of the plurality of electronic components 620*a* and 620*b* is the first-stage electronic component 620*a* having the element body lower surface 21*d* that does not face the other of the electronic components (second-stage electronic component 620*b* and the like). The first-stage electronic component 620*a* is the same as the electronic component 20 according to the first embodiment. That is, in the first-stage electronic component 620*a*, the terminal electrode portion 26 includes the base electrode layer 26*a*, the intermediate electrode layer 26*b*, and the surface electrode layer 26*c*.

In the first-stage electronic component 620*a*, in a cross section passing through the center 21*c* of the element body portion 21 and perpendicular to the element body lower surface 21*d* and the end surfaces 21*a* and 21*b*, the relation between the thickness T2 of the surface electrode layer 26*c* and the thickness T4 of the surface electrode layer 26*c* satisfies the equation (1), the thickness T2 being along the second reference line SL2 that is parallel to the element body lower surface 21*d* and passes through a height of three quarters of the entire element body portion 21 from the element body lower surface 21*d*, and the thickness T4 being along the fourth reference line SL4 that is parallel to the element body lower surface 21*d* and passes through a height of one quarter of the entire element body portion 21 from the element body lower surface 21*d*. In addition, in the case where the surface electrode layer 26*c* contains Sn, the relation between the thickness T2 of the surface electrode layer along the second reference line SL2 and the thickness T4 of the surface electrode layer along the fourth reference line SL4 preferably satisfies the expression (2). In addition, since details of the element body portion 21, and the base electrode layer 26*a*, the intermediate electrode layer 26*b*, and the surface electrode layer 26*c* forming the terminal electrode portion 26 are the same as those of the electronic component 20 according to the first embodiment, the description thereof will be omitted.

In the electronic component structure 610, the other one of the plurality of electronic components 620*a* and 620*b* is the second-stage electronic component 620*b* having the element body lower surface 21*d* facing the element body upper surface 21*e* of the first-stage electronic component 620*a*. The second-stage electronic component 620*b* has the same characteristics as those of the first-stage electronic component 620*a* except that a shape of a surface electrode layer 626*c* in a terminal electrode portion 626 is different from that of the first-stage electronic component 620*a*.

Regarding the terminal electrode portion 626 of the second-stage electronic component 620*b*, similar to the terminal electrode portion 126 of the electronic component 120 illustrated in FIG. 3, a cross-sectional shape of the terminal electrode portion 626 is substantially symmetrical with respect to the third reference line SL3 passing through the center 21*c* of the element body portion 21. That is, a thickness of the surface electrode layer 626*c* along the second reference line SL2 is substantially the same as a thickness of the surface electrode layer 626*c* along the fourth reference line SL4. In addition, since the element body portion 21, and the base electrode layer 26*a* and the intermediate electrode layer 26*b* forming the terminal electrode portion 26 are similar to those of the first-stage electronic component 620*a*, the description thereof will be omitted.

The first-stage electronic component 620*a* and the second-stage electronic component 620*b* are bonded by, for example, Sn—Sb-based soldering, TLPS bonding, or sintering bonding. The first-stage electronic component 620*a* and the second-stage electronic component 620*b* are connected by connecting one of the terminal electrode portions 26 of the first-stage electronic component 620*a* and one of the terminal electrode portions 626 of the second-stage electronic component 620*b*, and connecting the other of the terminal electrode portions 26 of the first-stage electronic component 620*a* and the other of the terminal electrode portions 626 of the second-stage electronic component 620*b*. That is, the electronic components 620*a* and 620*b* are stacked in a posture in which a facing direction of the end surface 21*a* and the end surface 21*b* on which the terminal electrode portions 26 and 626 are formed is a horizontal direction, and are electrically connected in parallel to each other. In the electronic component structure 610 illustrated in FIG. 7, a bonding material that bonds the plurality of electronic components 620*a* and 620*b* to each other is not illustrated. The same applies to other electronic component structures.

As illustrated in FIG. 7, the electronic component structure 610 can be mounted on the mounting substrate 82 by a reflow method. Similarly to the electronic component 20 illustrated in FIG. 2, in the terminal electrode portion 26 of the electronic component structure 610, since the thickness T2 of the surface electrode layer 26*c* along the second reference line SL2 is small, solder is prevented from wetting up to an upper side of the terminal electrode portion 26. In addition, in the electronic component structure 610, since the thickness T4 of the surface electrode layer 26*c* along the fourth reference line SL4 is large, the solder wets up on a lower side of the terminal electrode portion 26, and a solder fillet 683 having an appropriate shape is formed.

Figure 8:
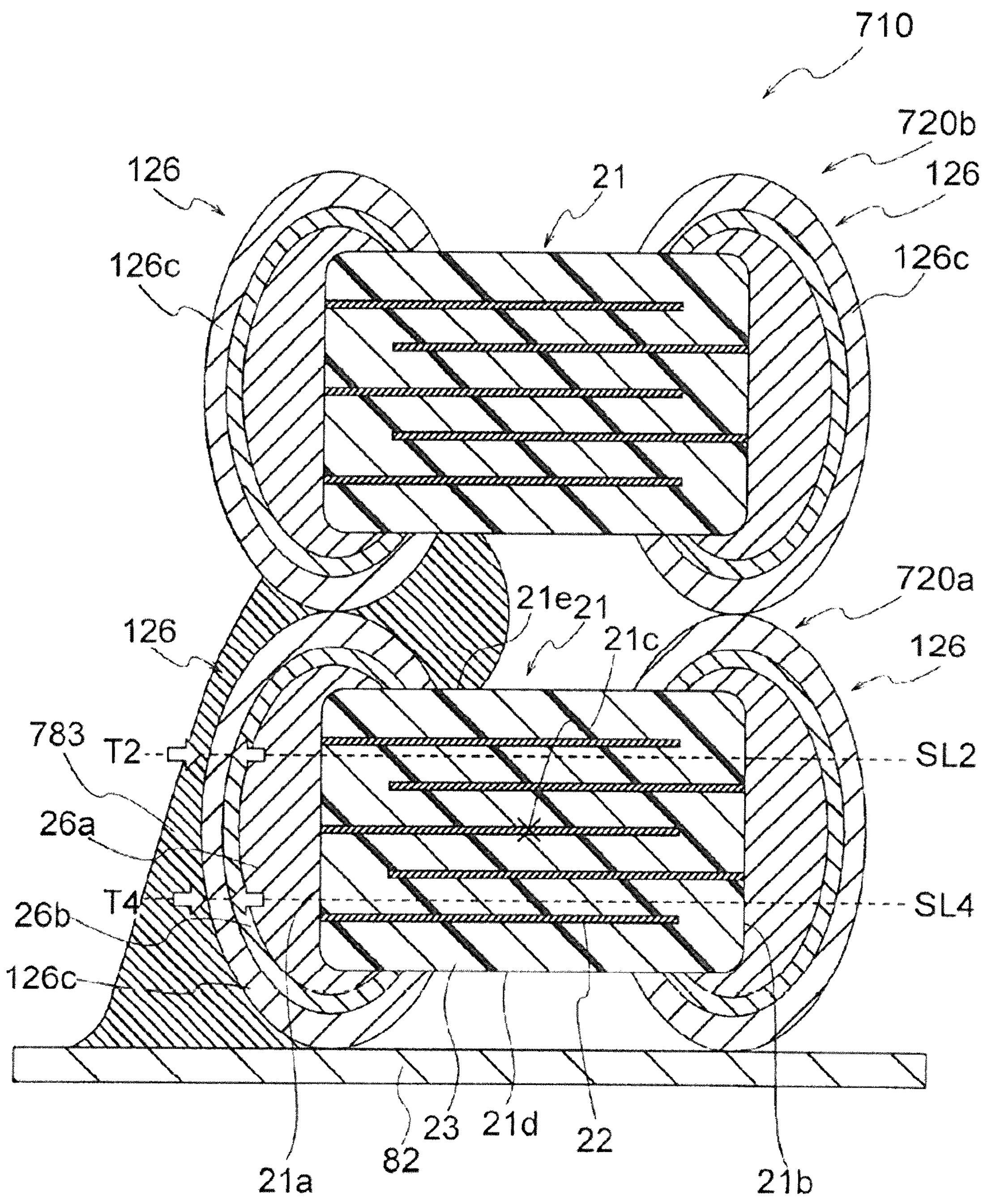
FIG. 8 is a schematic cross-sectional view illustrating an electronic component structure according to a second comparative example and a formation state of a solder fillet on the electronic component structure.

In contrast, FIG. 8 is a conceptual view illustrating a formation state of a solder fillet 783 formed on the terminal electrode portion 126 and the land of the mounting substrate 82 in a case where the electronic component structure 710 according to a second comparative example is mounted on the mounting substrate 82 by a reflow method. Two electronic components 720*a* and 720*b* provided in the electronic component structure 710 are the same as the electronic component 120 illustrated in FIG. 3.

As illustrated in FIG. 8, in the electronic component structure 710 according to the comparative example, regarding the electronic component 720*a* corresponding to the first-stage electronic component, the thickness of the surface electrode layer 126*c* formed in the terminal electrode portion 126 is substantially constant in the height direction. Therefore, excessive wetting up of solder such as exceeding the element body upper surface 21*e* of the element body portion 21 and a vertex of the terminal electrode portion 126 of the electronic component 720*a* may occur. Formation of the solder fillet 783 showing the excessive wetting up of solder as illustrated in FIG. 8 may lead to a short circuit failure or the like, which is not preferable.

As illustrated in FIG. 7, in the electronic component structure in which the plurality of electronic components 620*a* and 620*b* are stacked in the up-down direction, a narrow gap is formed between the first-stage electronic component 620*a* and the second-stage electronic component 620*b*. In this manner, as the solder fillet 783 illustrated in FIG. 8, there is a risk that excessively wet-up solder flows into a narrow gap between the electronic components 720*a* and 720*b*, which may cause a short circuit failure.

However, in the electronic component structure 610 illustrated in FIG. 7, since the thickness T2 of the surface electrode layer 26*c* along the second reference line SL2 is small, excessive wetting up of solder can be prevented, and an occurrence of a short circuit failure can be suitably prevented. In the electronic component structure 610 illustrated in FIG. 7, as the second-stage electronic component 620*b*, an electronic component including the surface electrode layer 626*c* having a substantially constant thickness in the height direction is used, but alternatively, as the second-stage electronic component 620*b*, an electronic component including a surface electrode layer having an asymmetric cross-sectional shape in the height direction may be used similarly to the first-stage electronic component 620*a*.

In addition, the electronic component structure 610 exhibits the same effect as that of the electronic component 20 in the points common to the electronic component 20 illustrated in FIGS. 1 and 2.

Figure 9:
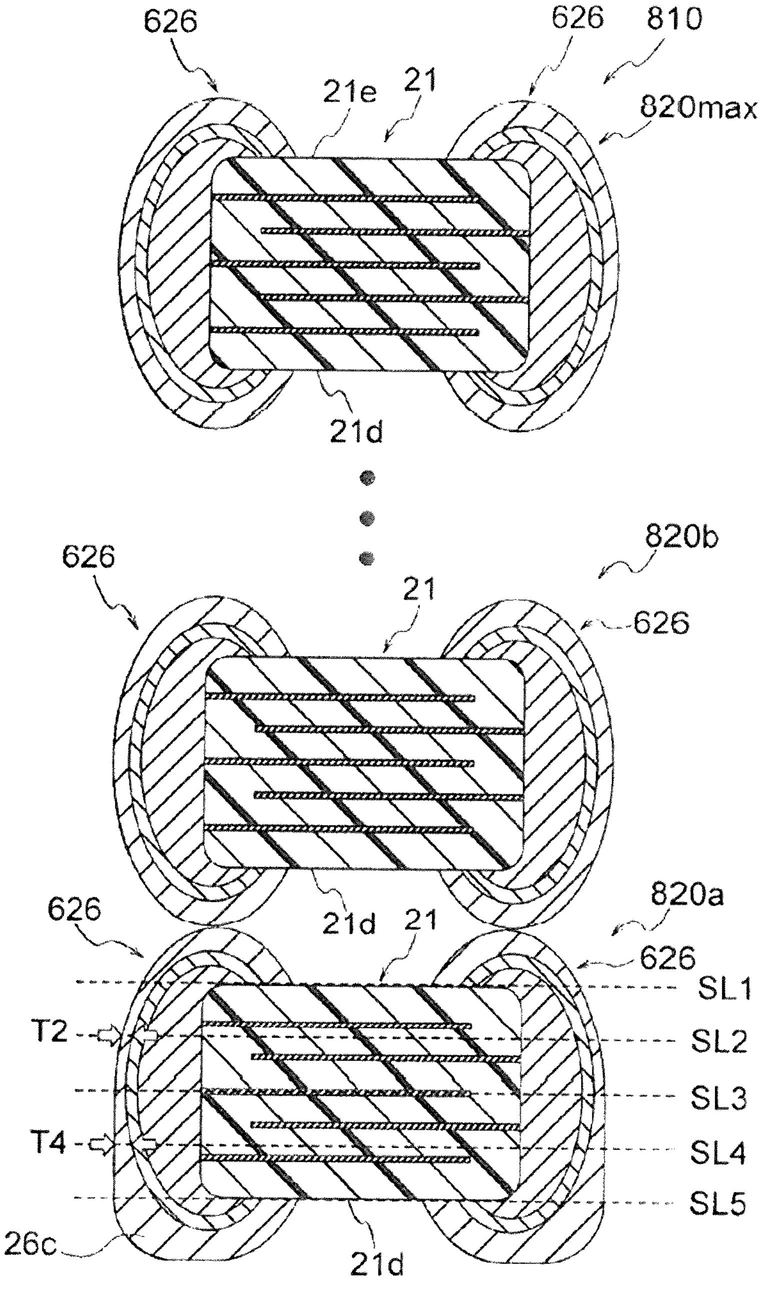
FIG. 9 is a schematic cross-sectional view illustrating an electronic component structure according to a fifth modification of the present disclosure.

The electronic component structure 610 illustrated in FIG. 7 includes the two electronic components 620*a* and 620*b*, but the number of electronic components included in the electronic component structure 610 is not limited to two, and the electronic component structure may include any two or more electronic components. FIG. 9 is a conceptual view illustrating a cross section of an electronic component structure 810 according to a fifth modification.

As illustrated in FIG. 9, the electronic component structure 810 is an electronic component structure in which any two or more electronic components (appropriately including a first-stage electronic component 820*a*, a second-stage electronic component 820*b*, an uppermost-stage electronic component 820max, and the like) are connected in the height direction. The electronic component structure 810 is the same as the electronic component structure 610 illustrated in FIG. 7 except that the number of electronic components stacked on the first-stage electronic component 820*a* is different. Regarding the electronic component structure 810, only differences thereof from the electronic component structure 610 will be described, and the same reference numerals are given to points common to the electronic component structure 610 and descriptions thereof will be omitted. In the electronic component structure 810, in a case where the number of electronic components is two, the second-stage electronic component 820*b* also serves as the uppermost-stage electronic component 820max, and the electronic component structure 810 is similar to the electronic component structure 610 illustrated in FIG. 7.

The first-stage electronic component 820*a* is similar to the first-stage electronic component 620*a* illustrated in FIG. 7, and the second-stage electronic component 820*b* is similar to the second-stage electronic component 620*b* illustrated in FIG. 7 except that another electronic component is further stacked on the second-stage electronic component 820*b*.

In addition, the uppermost-stage electronic component 820max includes the element body upper surface 21*e* that does not face other electronic components in the electronic component structure 810. The uppermost-stage electronic component 820max is the same as the second-stage electronic component 620*b* illustrated in FIG. 7 except that, the uppermost-stage electronic component 820max is not directly connected to the first-stage electronic component 820*a* except in a case where the number of electronic components included in the electronic component structure 810 is two, and another electronic component is present between the uppermost-stage electronic component 820max and the first-stage electronic component 820*a*. "..." in FIG. 9 indicates that electronic components (of which the number is any natural number (including 0)) illustrated as the second-stage electronic component 820*b* are present between the first-stage electronic component 820*a* and the uppermost-stage electronic component 820max.

The respective electronic components (first-stage electronic component 820*a*, second-stage electronic component 820*b*, and uppermost-stage electronic component 820max) included in the electronic component structure 810 are bonded by Sn—Sb-based soldering, TLPS bonding, sintering bonding, or the like, similarly to the electronic components included in the electronic component structure 610 illustrated in FIG. 7.

Similarly to the electronic component structure 610, in the electronic component structure 810, a relation between the thickness T2 of the surface electrode layer 26*c* along the second reference line SL2 and the thickness T4 of the surface electrode layer along the fourth reference line SL4 in the first-stage electronic component 820*a* satisfies the expression (1). Therefore, in the electronic component structure 810, it is possible to prevent the problem that the solder melted at the time of reflow excessively wets up to an upper side of the terminal electrode portion 626 of the first-stage electronic component 820*a* facing the land of the mounting substrate.

In addition, the electronic component structure 810 exhibits the same effect as that of the electronic component structure 610 in the points common to the electronic component structure 610 illustrated in FIG. 7.

Third Embodiment

Figure 10:
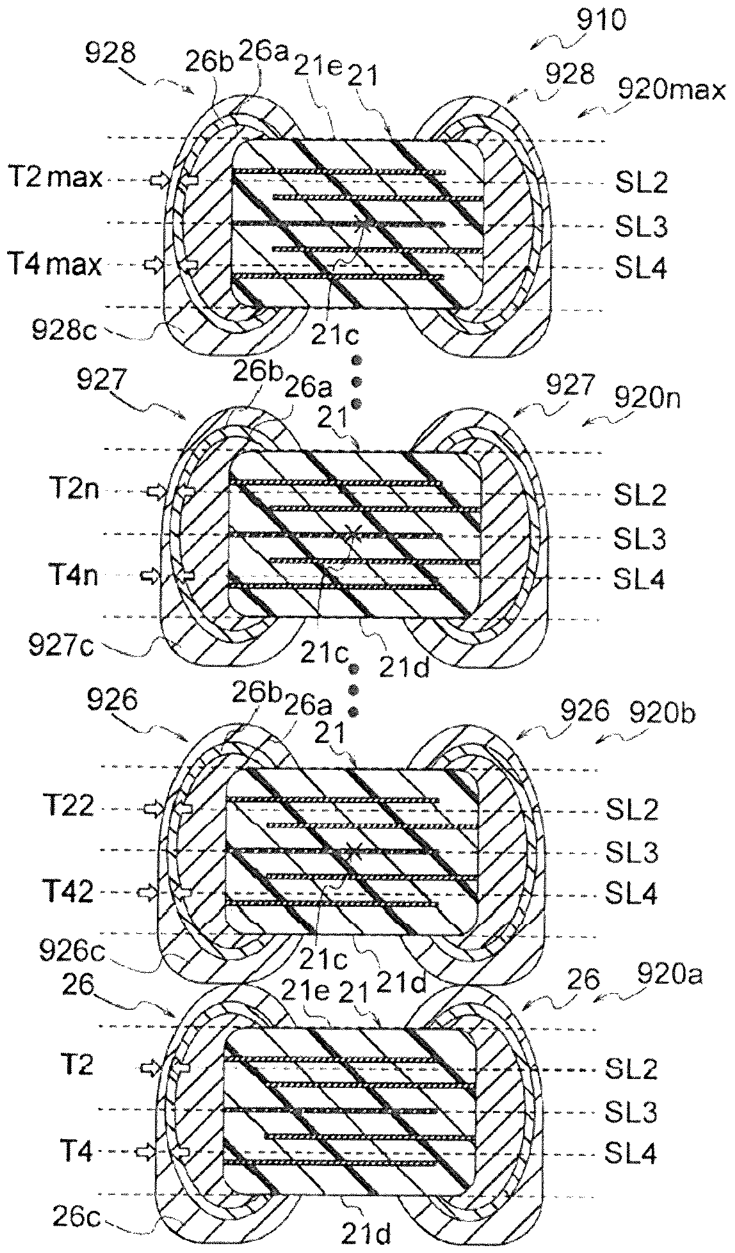
FIG. 10 is a schematic cross-sectional view illustrating an electronic component structure according to a third embodiment of the present disclosure.

FIG. 10 is a conceptual view illustrating a cross section of an electronic component structure 910 according to a third embodiment. As illustrated in FIG. 10, the electronic component structure 910 is an electronic component structure 910 in which any two or more electronic components (appropriately including a first-stage electronic component 920*a*, a second-stage electronic component 920*b*, an nth-stage electronic component 920*n*, an uppermost-stage electronic component 920max, and the like) are connected in the height direction. The electronic component structure 910 is different from the electronic component structure 810 illustrated in FIG. 9 in that, among the electronic components included in the electronic component structure 910, for electronic components (nth-stage electronic component 920*n*, uppermost-stage electronic component 920max, and the like) other than the first-stage electronic component 920*a*, cross-sectional shapes of the terminal electrode portions are vertically asymmetric as in the first-stage electronic component 920*a*.

However, the electronic component structure 910 is the same as the electronic component structure 810 except that the cross-sectional shapes of the terminal electrode portions of the electronic components other than the first-stage electronic component 920*a* are vertically asymmetric. Regarding the electronic component structure 910, only differences thereof from the electronic component structure 810 will be described, and the same reference numerals are given to points common to the electronic component structure 810 and descriptions thereof will be omitted.

The respective electronic components (first-stage electronic component 920*a*, second-stage electronic component 920*b*, nth-stage electronic component 920*n*, and uppermost-stage electronic component 920max) included in the electronic component structure 910 are bonded by Sn—Sb-based soldering, TLPS bonding, sintering bonding, or the like, similarly to the electronic components included in the electronic component structure 810 illustrated in FIG. 9.

The first-stage electronic component 920*a* is similar to the first-stage electronic component 820*a* illustrated in FIG. 9. Unlike the second-stage electronic component 820*b* illustrated in FIG. 9, the second-stage electronic component 920*b* includes vertically asymmetric terminal electrode portions 926 similar to the terminal electrode portions 26 of the first-stage electronic component 920*a*.

The second-stage electronic component 920*b* has the element body lower surface 21*d* facing the element body upper surface 21*e* of the first-stage electronic component 920*a*. Similarly to the terminal electrode portion 26 of the first-stage electronic component 920*a*, the terminal electrode portion 926 of the second-stage electronic component 920*b* includes the base electrode layer 26*a* that is in direct contact with the end surfaces 21*a* and 21*b* of the element body portion 21, the intermediate electrode layer 26*b*, and a surface electrode layer 926*c* that covers the base electrode layer 26*a* and constitutes an outermost surface of the terminal electrode portion 926.

In the terminal electrode portion 926 of the second-stage electronic component 920*b*, in particular, a cross-sectional shape of the surface electrode layer 926*c* is vertically asymmetric with respect to the third reference line SL3 passing through the center 21*c* of the element body portion 21 of the second-stage electronic component 920*b*. That is, a thickness of the surface electrode layer 926*c* along the fourth reference line SL4 is larger than a the thickness of the surface electrode layer 926*c* along the second reference line SL2.

Accordingly, in the electronic component structure 910, the following relation is preferably established between the cross-sectional shape of the surface electrode layer 926*c* of the second-stage electronic component 920*b* and the cross-sectional shape of the surface electrode layer 26*c* of the first-stage electronic component 920*a*. That is, it is preferable that in a cross section passing through the center 21*c* of the element body portion 21 and perpendicular to the element body lower surface 21*d* and the end surfaces 21*a* and 21*b* of the element body portion 21 in the second-stage electronic component 920*b*, a relation between a thickness T42 of the surface electrode layer 926*c* and the thickness T2 of the surface electrode layer 26*c* satisfies an expression (4), the thickness T42 being along the fourth reference line SL4 that is parallel to the element body lower surface 21*d* and passes through a height of one quarter of the entire element body portion 21 from the element body lower surface 21*d*, and the thickness T2 being along the second reference line SL2 in the first-stage electronic component 920*a*.

$$1.3 \leq T42/T2 \leq 32 \qquad \text{Equation (4)}$$

With such an electronic component structure 910, excessive wetting up of solder in the first-stage electronic component 920*a* can be prevented, and bonding strength between the first-stage electronic component 920*a* and the second-stage electronic component 920*b* can be appropriately ensured by increasing the thickness T42 of the surface electrode layer 926*c* along the fourth reference line SL4 of the second-stage electronic component 920*b* in an appropriate balance within a predetermined range.

The nth-stage electronic component 920*n* illustrated in FIG. 10 is an electronic component stacked on the first-stage electronic component 820*a* illustrated in FIG. 9 in the electronic component structure 910, and has the element body lower surface 21*d* facing any other electronic components (including the first-stage electronic component 920*a*, the second-stage electronic component 920*b*, and other nth-stage electronic components 920*n*). In FIG. 10, the second-stage electronic component 920*b* is described separately from the nth-stage electronic component 920*n*, but the second-stage electronic component 920*b* is an nth-stage electronic component 920*n* at a specific position (immediately above the first-stage electronic component 920*a*). Similarly, the uppermost-stage electronic component 920max is an nth-stage electronic component 920*n* located at a specific position (an uppermost position in the electronic component structure 910).

In addition, " . . . " in FIG. 10 indicates that electronic components (of which the number is any natural number (including 0)) illustrated as the nth-stage electronic component 920*n* are present between the second-stage electronic component 920*b* and the uppermost-stage electronic component 920max. In the electronic component structure 910, in a case where the number of electronic components is two, the second-stage electronic component 920*b* also serves as the uppermost-stage electronic component 920max.

The nth-stage electronic component 920*n* illustrated in FIG. 10 includes vertically asymmetric terminal electrode portions 927 similar to the terminal electrode portions 26 of the first-stage electronic component 920*a*. Similarly to the terminal electrode portion 26 of the first-stage electronic component 920*a*, the terminal electrode portion 927 of the nth-stage electronic component 920*n* includes the base electrode layer 26*a* that is in direct contact with the end surfaces 21*a* and 21*b* of the element body portion 21, the intermediate electrode layer 26*b*, and a surface electrode layer 927*c* that covers the base electrode layer 26*a* and constitutes an outermost surface of the terminal electrode portion 927.

In the terminal electrode portion 927 of the nth-stage electronic component 920*n*, as described also in the terminal electrode portion 926 of the second-stage electronic component 920*b*, in particular, a cross-sectional shape of the surface electrode layer 927*c* is vertically asymmetric with respect to the third reference line SL3 passing through the center 21*c* of the element body portion 21 of the nth-stage electronic component 920*n*. That is, in a cross section passing through the center 21*c* of the element body portion 21 and perpendicular to the element body lower surface 21*d* and the end surfaces 21*a* and 21*b* of the element body portion 21 in the nth-stage electronic component 920*n*, a relation between a thickness T2*n* of the surface electrode layer 927*c* and a thickness T4*n* of the surface electrode layer 927*c* satisfies the following equation (5), the thickness T2*n* being along the second reference line SL2 that is parallel to the element body lower surface 21*d* and passes through a height of three quarters of the entire element body portion 21 from the element body lower surface 21*d*, and the thickness T4*n* being along the fourth reference line SL4 that is parallel to the element body lower surface 21*d* and passes through a height of one quarter of the entire element body portion 21 from the element body lower surface 21*d*.

$$1.3 \leq T4n/T2n \leq 15.0 \qquad \text{Equation (5)}$$

In such an electronic component structure 910, since the center of gravity of the nth-stage electronic component 920*n* is low, it is easy to stably install the nth-stage electronic component 920*n* on another electronic component by a robot arm or the like, and it is possible to smoothly perform a bonding process of the electronic components, resulting in good productivity. In addition, in the electronic component structure 910, all the electronic components (including the second-stage electronic component 920*b* and the uppermost-stage electronic component 920max) other than the first-stage electronic component 920*a* among the plurality of electronic components may have characteristics of the terminal electrode portion 927 of the nth-stage electronic component 920*n* represented by the expression (5). In such an electronic component structure 910, since the center of gravity is low, it is possible to prevent an occurrence of an overturning failure at the time of reflow mounting.

The uppermost-stage electronic component 920max illustrated in FIG. 10 has the element body upper surface 21*e* that does not face other electronic components in the electronic component structure 910. The uppermost-stage electronic component 920max includes vertically asymmetric terminal electrode portions 928 similar to the terminal electrode portions 26 of the first-stage electronic component 920*a*. Similarly to the terminal electrode portion 26 of the first-stage electronic component 920*a*, the terminal electrode portion 928 of the uppermost-stage electronic component 920max includes the base electrode layer 26*a* that is in direct contact with the end surfaces 21*a* and 21*b* of the element body portion 21 of the uppermost-stage electronic component 920max, the intermediate electrode layer 26*b*, and a surface electrode layer 928*c* that covers the base electrode layer 26*a* and constitutes an outermost surface of the terminal electrode portion 928.

In the terminal electrode portion 928 of the uppermost-stage electronic component 920max, in particular, a cross-sectional shape of the surface electrode layer 928*c* is vertically asymmetric with respect to the third reference line SL3 passing through the center 21*c* of the element body portion 21 of the uppermost-stage electronic component 920max. That is, in the surface electrode layer 928*c*, a thickness T2max of the surface electrode layer 928*c* along the second reference line SL2 is smaller than a thickness T4max of the surface electrode layer 928*c* along the fourth reference line SL4.

Accordingly, in the electronic component structure 910, the following relation is preferably established between the cross-sectional shape of the surface electrode layer 928*c* of the uppermost-stage electronic component 920max and the cross-sectional shape of the surface electrode layer 26*c* of the first-stage electronic component 920*a*. That is, it is preferable that in a cross section passing through the center 21*c* of the element body portion 21 and perpendicular to the element body lower surface 21*d* and the element body end surfaces 21*a* and 21*b* of the element body portion 21 in the uppermost-stage electronic component 920max, a relation between the thickness T2max of the surface electrode layer 928*c* and the thickness T4 of the surface electrode layer 26*c* satisfies the following expression (6), the thickness T2max being along the second reference line SL2 that is parallel to the element body lower surface 21*d* and passes through a height of one quarter of the entire element body portion 21 from the element body lower surface 21*d*, and the thickness T4 being along the fourth reference line SL4 in the first-stage electronic component 920*a*.

$$T2\text{max} < T4 \qquad \text{Equation (6)}$$

In such an electronic component structure 910, since the center of gravity is low, it is possible to prevent the occurrence of an overturning failure at the time of reflow mounting. In addition, the electronic component structure 910 exhibits the same effect as that of the electronic component structure 810 in the points common to the electronic component structure 810.

EXAMPLES

Hereinafter, the electronic component and the electronic component structure according to the present disclosure will be further described with reference to examples, but the electronic component and the electronic component structure according to the present disclosure are not limited to these examples.

<Evaluation 1>

The following samples 01 to 10 were prepared, and tests to be described below were performed.

(Sample 01)

As the sample 01, ten samples were prepared for each of an example of the electronic component 120 (see FIG. 3) according to the first comparative example and an example of the electronic component structure 710 according to the second comparative example (see FIG. 8) in which the electronic components 120 are stacked in two stages and bonded.

Specifically, a chip capacitor of 4.5 mm×3.2 mm×2.2 mm (target value) was prepared as the electronic component 120. In the terminal electrode portion 126, a Cu baked electrode was formed on the end surfaces 21*a* and 21*b* of the element body portion 21 to form the base electrode layer 26*a*, and a Ni layer was formed on the base electrode layer 26*a* by wet plating to form the intermediate electrode layer 26*b*. Further, by forming a Sn layer on the intermediate electrode layer 26*c* by wet plating (barrel method), an electronic component 120 according to the sample 01 was prepared in which a thickness T2 of the surface electrode layer 126*c* along the second reference line SL2 and a thickness T4 of the surface electrode layer 126*c* along the fourth reference line SL4 were both 1.6 μm. Further, two electronic components 120 according to the sample 01 were stacked in two stages as illustrated in FIG. 8 using Sn—Sb-based soldering and bonded, and an electronic component structure 710 according to the sample 01 was prepared.

(Sample 02)

As the sample 02, ten samples were prepared for each of an example of the electronic component 120 and an example of the electronic component structure 710, in which only thicknesses of the surface electrode layer 126*c* were different from those in the sample 01. In the sample 02, the thickness T2 of the surface electrode layer 126*c* along the second reference line SL2 and the thickness T4 of the surface electrode layer 126*c* along the fourth reference line SL4 were both 4.0 μm. The thickness of the surface electrode layer 126*c* was adjusted by a treatment time of barrel plating.

(Sample 03)

As the sample 03, ten samples were prepared for each of an example of the electronic component 20 (see FIG. 1) according to the first embodiment and an example of the electronic component structure 910 according to the third embodiment (see FIG. 10) in which the electronic components 20 are stacked in two stages and bonded. Specifically, a chip capacitor of 4.5 mm×3.2 mm×2.2 mm (target value) was prepared as the electronic component 20. In the terminal electrode portion 26, a Cu baked electrode was formed on the end surfaces 21*a* and 21*b* of the element body portion 21 to form the base electrode layer 26*a*, and a Ni layer was formed on the base electrode layer 26*a* by wet plating to form the intermediate electrode layer 26*b*. Further, after a Sn layer having a uniform thickness T2 was formed on the intermediate electrode layer 26*b* by wet plating (barrel method), a lower portion of the terminal electrode portion 26 was subjected to electroplating with Sn to partially increase a thickness of the Sn layer which is the surface electrode layer. Accordingly, an electronic component 20 according to the sample 03 was prepared in which the thickness T2 of the surface electrode layer 126*c* along the second reference line SL2 was 3.1 μm and the thickness T4 of the surface electrode layer 26*c* along the fourth reference line SL4 was 4.0 μm. Further, two electronic components 20 according to the sample 03 were stacked in two stages using Sn—Sb-based soldering as the first-stage electronic component 920*a* and the second-stage electronic component 920*b* illustrated in FIG. 10 and bonded, and an electronic component structure 910 according to the sample 03 was prepared.

(Sample 04 to Sample 08)

As the samples 04 to 08, for each sample, ten samples were prepared for each of an example of the electronic component 20 and an example of the electronic component structure 910, in which only thicknesses of the surface electrode layer 26*c* were different from those in the sample 03. In the samples 04 to 08, the thicknesses T2 of the surface electrode layer 26*c* along the second reference line SL2 were 1.6 μm, 0.5 μm, 1.6 μm, 1.6 μm, and 0.5 μm, respectively, and the thicknesses T4 of the surface electrode layer 26*c* along the fourth reference line SL4 were 4.0 μm, 4.0 μm, 12.8 μm, 24.0 μm, and 7.5 μm, respectively. The thicknesses T2 of the surface electrode layer 26*c* along the second reference line SL2 were adjusted by a treatment time of barrel plating, and the thicknesses T4 of the surface electrode layer 26*c* along the fourth reference line SL4 were adjusted by a treatment time of electroplating.

(Sample 09 and Sample 10)

As the samples 09 and 10, for each sample, ten samples were prepared for each of the electronic component and the electronic component structure, in which only thicknesses of the surface electrode layer 26*c* were different from those in the sample 03. In the samples 09 and 10, cross-sectional shapes are similar to those of the electronic component 20 (see FIG. 1) according to the first embodiment and the electronic component structure 910 according to the third embodiment (see FIG. 10), but values of T4/T2 in the electronic component exceed an upper limit value of the expression (1). That is, in the samples 09 and 10, the thicknesses T2 of the surface electrode layer 26*c* along the second reference line SL2 were 0.2 μm and 1.6 μm, respectively, and the thicknesses T4 of the surface electrode layer 26*c* along the fourth reference line SL4 were 4.0 μm and 40.0 μm, respectively. The thicknesses T2 of the surface electrode layer 26*c* along the second reference line SL2 were adjusted by a treatment time of barrel plating, and the thicknesses T4 of the surface electrode layer 26*c* along the fourth reference line SL4 were adjusted by a treatment time of electroplating.

(Test Method for Each Sample)

Among the prepared samples of respective levels, three tests including a mounting appearance test, a whisker test, and a product dimension test were performed on the electronic components 120 and 20 each stacked in one stage. In the mounting appearance test, each sample was surface-mounted on a mounting substrate by a reflow method, and presence or absence of cracks formed in appearances of element bodies of a solder fillet, a terminal electrode, and an electronic component was confirmed. A crack ratio of 0% was evaluated as good, a crack ratio of 10% or less was evaluated as acceptable, and a crack ratio exceeding 10% was evaluated as unacceptable. In the whisker test, after a sample was placed in a high temperature and high humidity environment (85° C. and 82 RH %) and left for 2,000 hours, a surface electrode layer was observed with a microscope at a magnification of 2,000 times, presence or absence of generation of a whisker was confirmed, and a whisker length was measured. A radius of a class sphere centered on a generation point of the whisker was defined as the whisker length, and a level of the whisker length of 20 μm or less was considered to be acceptable. In the product dimension test, a level of an average value within plus or minus 1.0% with respect to a target value of a dimension of an electronic component was considered to be acceptable. In addition, with respect to the electronic component structures 710 and 910 each stacked in two stages, each sample was surface-mounted on the mounting substrate by the reflow method, then an energization test was performed, and an occurrence rate of a short circuit failure was confirmed. A short circuit rate of 0% was evaluated as good, a short circuit rate of 10% or less was evaluated as acceptable, and a short circuit rate exceeding 10% was evaluated as unacceptable. Results are shown in Table 1.

component structure 910 stacked in two stages were improved by changing the value of T4/T2 from 1.0 to 1.3. In the sample 03 in which the value of T4/T2 was set to be an appropriate value, excessive wetting up of solder at the time of reflow bonding was prevented, and a solder fillet having an appropriate shape was formed in the lower half of the terminal electrode portion 26 as illustrated in FIGS. 2 and 7.

From the test results of the samples 04 to 08 in Table 1, good results were obtained in all the tests by setting the value of T4/T2 to be a value of 2.5 to 15.0 in the electronic component 20 having the surface electrode layer 26*c* containing Sn and the electronic component structure 910. From a comparison between the sample 04 and the sample 03, it was found that the short circuit rate of the electronic component structure 910 was further improved by changing the value of T4/T2 from 1.3 to 2.5. It could be confirmed that in the electronic component 20 and the electronic component structure 910, a solder fillet having a particularly suitable shape was formed by setting the value of T4/T2 to be a value of 2.5 to 15.0.

In the sample 09 in Table 1, a problem was found in the whisker test (high temperature and high humidity environment test). It was confirmed that when the value of T4/T2

TABLE 1

| | | | | | One-stage stacking | | | First stage of two-stage stacking |
|---|---|---|---|---|---|---|---|---|
| | Plating type | T2 (μm) | T4 (μm) | T4/T2 | Crack ratio in appearance after mounting | Whisker | Product dimension | Short circuit rate after mounting |
| Sample 01 | Sn | 1.6 | 1.6 | 1.0 | 100%*1 | Acceptable | Acceptable | 100%*1 |
| Sample 02 | | 4.0 | 4.0 | 1.0 | 40% | Acceptable | Acceptable | 60% |
| Sample 03 | | 3.1 | 4.0 | 1.3 | 0% | Acceptable | Acceptable | 10% |
| Sample 04 | | 1.6 | 4.0 | 2.5 | 0% | Acceptable | Acceptable | 0% |
| Sample 05 | | 0.5 | 4.0 | 8.0 | 0% | Acceptable | Acceptable | 0% |
| Sample 06 | | 1.6 | 12.8 | 8.0 | 0% | Acceptable | Acceptable | 0% |
| Sample 07 | | 1.6 | 24.0 | 15.0 | 0% | Acceptable | Acceptable | 0% |
| Sample 08 | | 0.5 | 7.5 | 15.0 | 0% | Acceptable | Acceptable | 0% |
| Sample 09 | | 0.2 | 4.0 | 25.0 | 0% | NG | Acceptable | 0% |
| Sample 10 | | 1.6 | 40.0 | 25.0 | 0% | Acceptable | NG | 0% |

*1Wetting failure occurred in all samples (Overall Evaluation of Evaluation 1)

From the results of the sample 01 in Table 1, it was confirmed that in a case where the thickness T2 and the thickness T4 were the same, the thickness T4 of the surface electrode layer 126*c* was too small, and thus solder at the time of reflow bonding did not appropriately wet up to the surface electrode layer 126*c*, and mounting failure occurred. In addition, from the sample 02, it was confirmed that in a case where the thickness T2 and the thickness T4 of the surface electrode layer 126*c* were the same, even when the thickness of the surface electrode layer 126*c* was uniformly increased, excessive tensile stress was applied to the mounted sample due to excessive wetting up of solder at an upper portion at the time of reflow bonding (see FIG. 3), and the crack ratio in appearance was high. Further, it was confirmed that in the sample 02 relating to the electronic component structure 710 stacked in two stages, the solder was excessively wet up at the upper portion at the time of reflow bonding (see FIG. 8) and the short circuit rate was increased.

From a comparison between the test results of the sample 03 and the sample 02 in Table 1, it was found that the crack ratio in appearance of the electronic component 20 stacked in one stage and the short circuit rate of the electronic exceeds a predetermined value due to the thickness T2 being too small, a problem of generation of whiskers occurred. In the sample 10 in Table 1, a problem was found in product dimension. It was confirmed that when the value of T4/T2 exceeds the predetermined value due to the thickness T4 being too large, a problem that it is difficult to keep the product dimension within the target value occurred.

<Evaluation 2>

The following samples 11 to 18 were prepared, and tests to be described below were performed.

(Sample 11)

Similarly to the sample 01, as the sample 11, ten samples were prepared for each of an example of the electronic component 120 (see FIG. 3) according to the first comparative example and an example of the electronic component structure 710 according to the second comparative example (see FIG. 8) in which the electronic components 120 are stacked in two stages and bonded. However, the sample 11 was different from the sample 01 in that a material of the surface electrode layer 126*c* was Au, and the thickness T2 of the surface electrode layer 126*c* along the second reference line SL2 and the thickness T4 of the surface electrode layer 126*c* along the fourth reference line SL4 were both 0.13 μm. A method of manufacturing the sample 11 was the same as a method of manufacturing the sample 01 except that a material of the wet plating was changed.

(Sample 12)

As the sample 12, ten samples were prepared for each of an example of the electronic component 120 and an example of the electronic component structure 710, in which only thicknesses of the surface electrode layer 126*c* were different from those in the sample 11. In the sample 12, the thickness T2 of the surface electrode layer 126*c* along the second reference line SL2 and the thickness T4 of the surface electrode layer 126*c* along the fourth reference line SL4 were both 0.20 μm.

(Sample 13)

Similarly to the sample 03, as the sample 13, ten samples were prepared for each of an example of the electronic component 20 (see FIG. 1) according to the first embodiment and an example of the electronic component structure 910 according to the third embodiment (see FIG. 10) in which the electronic components 20 are stacked in two stages and bonded. However, the sample 13 was different from the sample 11 in that the material of the surface electrode layer 26*c* was Au, and the thickness T2 of the surface electrode layer 26*c* along the second reference line SL2 was 0.15 μm and the thickness T4 of the surface electrode layer 26*c* along the fourth reference line SL4 was 0.20 μm. A method of manufacturing the sample 13 was the same as a method of manufacturing the sample 03 except that the material of the wet plating was changed.

(Sample 14 and Sample 15)

As the samples 14 and 15, for each sample, ten samples were prepared for each of an example of the electronic component 20 and an example of the electronic component structure 910, in which only thicknesses of the surface electrode layer 26*c* were different from those in the sample 13. In the samples 14 and 15, the thicknesses T2 of the surface electrode layer 26*c* along the second reference line SL2 were 0.08 μm and 0.03 μm, respectively, and the thicknesses T4 of the surface electrode layer 26*c* along the fourth reference line SL4 were 0.20 μm and 0.20 μm, respectively. The thicknesses T2 of the surface electrode layer 26*c* along the second reference line SL2 and the thicknesses T4 of the surface electrode layer 26*c* along the fourth reference line SL4 were adjusted by a treatment time of plating.

(Sample 16 to Sample 18)

As the samples 16 to 18, for each sample, ten samples were prepared for the electronic component and the electronic component structure, in which only thicknesses of the surface electrode layer 26*c* were different from those in the sample 13. In the samples 16 to 18, the value of T4/T2 in the electronic component was within a range of the expression (1), but exceeded an upper limit value of the expression (3). That is, in the samples 16 to 18, the thicknesses T2 of the surface electrode layer 26*c* along the second reference line SL2 were 0.03 μm, 0.01 μm, and 0.13 μm, respectively, and the thicknesses T4 of the surface electrode layer 26*c* along the fourth reference line SL4 were 0.45 μm, 0.20 μm, and 1.95 μm, respectively. The thicknesses T2 of the surface electrode layer 26*c* along the second reference line SL2 and the thicknesses T4 of the surface electrode layer 26*c* along the fourth reference line SL4 were adjusted by a treatment time of plating.

(Test Method)

Among the prepared samples of respective levels, a mounting appearance test, a gas corrosion test, and cost evaluation were performed on the electronic components 120 and 20 each stacked in one stage. The mounting appearance test was the same as in Evaluation 1. In the gas corrosion test, it was confirmed that after a sample was placed in a hydrogen sulfide ($H_2S$) gas atmosphere ($H_2S$: 3 ppm, 80% RH) and then left for 48 hours, corrosion did not progress in the base electrode layer 26*a* of the terminal electrode. In the test, a level at which corrosion on the base electrode layer 26*a* was not observed in all samples was considered to be acceptable. In the cost evaluation, since Au is very expensive, samples having a portion where a thickness of an Au plating exceeded 1 μm were considered to be unacceptable. In addition, with respect to the electronic component structures 710 and 910 each stacked in two stages, the occurrence rate of the short circuit failure was confirmed in the same manner as in Evaluation 1. Results are shown in Table 2.

TABLE 2

| | | | | | One-stage stacking | | | First stage of two-stage stacking |
|---|---|---|---|---|---|---|---|---|
| | Plating type | T2 (μm) | T4 (μm) | T4/T2 | Crack ratio in appearance after mounting | Gas corrosion | Cost | Short circuit rate after mounting |
| Sample 11 | Au | 0.13 | 0.13 | 1.0 | 100%*1 | Acceptable | Acceptable | 100%*1 |
| Sample 12 | | 0.20 | 0.20 | 1.0 | 70% | Acceptable | Acceptable | 80% |
| Sample 13 | | 0.15 | 0.20 | 1.3 | 10% | Acceptable | Acceptable | 10% |
| Sample 14 | | 0.08 | 0.20 | 2.5 | 0% | Acceptable | Acceptable | 0% |
| Sample 15 | | 0.03 | 0.20 | 8.0 | 0% | Acceptable | Acceptable | 0% |
| Sample 16 | | 0.03 | 0.45 | 15.0 | 0% | Acceptable | Acceptable | 0% |
| Sample 17 | | 0.01 | 0.20 | 15.0 | 0% | NG | Acceptable | 0% |
| Sample 18 | | 0.13 | 1.95 | 15.0 | 0% | Acceptable | NG | 0% |

*1Wetting failure occurred in all samples (Overall Evaluation of Evaluation 2)

From the results of the samples 11 and 12 in Table 2, it could be confirmed that, in a case where the thickness T2 and the thickness T4 were the same, similarly to the case where the material of the surface electrode layer 126*c* was Sn, in a case where the material of the surface electrode layer 126*c* was Au, there was a problem in the mounting appearance test and the short circuit failure rate after mounting, and a solder fillet having an appropriate shape was not likely to be formed.

From a comparison between the test results of the sample 13 and the sample 12 in Table 1, it was found that also in a case where the material of the surface electrode layer 26*c* was Au, the crack ratio in appearance of the electronic component 20 stacked in one stage and the short circuit rate of the electronic component structure 910 stacked in two stages were improved by changing the value of T4/T2 from 1.0 to 1.3. In the sample 13 in which the value of T4/T2 was set to be an appropriate value, excessive wetting up of solder at the time of reflow bonding was prevented, and a solder fillet having an appropriate shape was formed in the lower half of the terminal electrode portion 26 as illustrated in FIGS. 2 and 7.

From the test results of the samples 14 and 15 in Table 1, good results were obtained in all the tests by setting the value of T4/T2 to be a value of 2.5 to 8.0 in the electronic component 20 having the surface electrode layer 26*c* containing Au and the electronic component structure 910. From a comparison between the sample 14 and the sample 13, it was found that the short circuit rate of the electronic component structure 910 was further improved by changing the value of T4/T2 from 1.3 to 2.5. It could be confirmed that in the electronic component 20 having the surface electrode layer 26*c* containing Au and the electronic component structure 910, a solder fillet having a particularly suitable shape was formed by setting the value of T4/T2 to be a value of 2.5 to 8.0.

From the test results of the samples 16 to 18 in Table 1, it was confirmed that a problem occurred depending on conditions of T2 and T4 when the value of T4/T2 became a value of 8.0 in the electronic component 20 having the surface electrode layer 26*c* containing Au and the electronic component structure 910. That is, in the sample 17, the thickness T2 was too small and corrosion of the terminal electrode was observed in the gas corrosion test. In addition, in the sample 18, the thickness T4 was too large and there was a problem in terms of cost.

<Evaluation 3>

The following samples 19 to 42 were prepared, and tests to be described below were performed.

(Sample 19 to Sample 42)

As the samples 19 to 42, similarly to the electronic component structures of the samples 01 to 10, twenty samples were prepared for an example of the electronic component structure 910 according to the third embodiment (see FIG. 10) in which the first-stage electronic component 920*a* and the second-stage electronic component 920*b* were stacked in two stages and bonded. A method of preparing the electronic component structure 910 is the same as that of the samples 01 to 10 prepared in Evaluation 1. However, in the samples 19 to 42, the first-stage electronic component 920*a* and the second-stage electronic component 920*b* were prepared by not only combing those having the same T2 and T4 but also combing those of various T2 and T4.

As shown in Table 3 to be described later, in the samples 19 to 42 of Evaluation 3, it was confirmed whether a problem occurred in the bonding strength and the short circuit rate during mounting in combing various first-stage electronic components 920*a* and second-stage electronic components 920*b*. That is, as the first-stage electronic component 920*a*, those having the thickness T2 of 3.1 μm and the thickness T4 of 4.0 μm (samples 19 to 22), those having the thickness T2 of 1.6 μm and the thickness T4 of 4.0 μm (samples 23 to 27), those having the thickness T2 of 0.5 μm and the thickness T4 of 4.0 μm (samples 28 to 30), those having the thickness T2 of 1.6 μm and the thickness T4 of 12.8 μm (samples 31 to 33), those having the thickness T2 of 1.6 μm and the thickness T4 of 24.0 μm (samples 34 to 38), and those having the thickness T2 of 0.5 μm and the thickness T4 of 7.5 μm (samples 39 to 42) were used. In addition, as the second-stage electronic component 920*b*, those having the thickness T42 of the surface electrode layer 926*c* along the fourth reference line SL4 of the second-stage electronic component 920*b* of 0.5 μm, 1.5 μm, 4.0 μm, 8.0 μm, and 16.0 μm were used.

(Test Method)

The prepared samples of respective levels were mounted on a mounting substrate by a reflow method, and a stacking bonding strength test and a short circuit failure occurrence rate were evaluated. In the stacking bonding strength test, a force in a lateral direction was continuously applied to the second-stage electronic component 920*b* (see FIG. 7) of the mounted electronic component structure 910, and a ratio of samples in which bonding between the first-stage electronic component 920*a* and the second-stage electronic component 920*b* is released earlier than bonding between the mounting substrate and the first-stage electronic component 920*a* was evaluated for each level. Regarding the ratio of the samples in which the bonding of the first-stage electronic component 920*a* and the second-stage electronic component 920*b* is released earlier, those of which the ratio is 0% is evaluated as "Excellent", those of which the ratio is more than 0% and 5% or less is evaluated as "Good", those of which the ratio is more than 5% and 20% or less is evaluated as "Fair" and those of which the ratio is more than 20% is evaluated as "Poor". The short circuit rate was measured in the same manner as in Evaluation 1 and Evaluation 2, and a short circuit rate of 10% or less was evaluated as "Good", and a short circuit rate exceeding 10% was evaluated as "Poor". Results are shown in Table 3.

TABLE 3

| | Plating | First-stage | | | Second-stage | Second-stage/ first-stage | Stacking bonding | Stacking short circuit |
|---|---|---|---|---|---|---|---|---|
| | type | T2 (μm) | T4 (μm) | T4/T2 | T42 (μm) | T42/T2 | strength | rate |
| Sample 19 | Sn | 3.1 | 4.0 | 1.3 | 0.5 | 0.2 | Fair | Good |
| Sample 20 | | 3.1 | 4.0 | 1.3 | 4.0 | 1.3 | Good | Good |
| Sample 21 | | 3.1 | 4.0 | 1.3 | 8.0 | 2.6 | Excellent | Good |
| Sample 22 | | 3.1 | 4.0 | 1.3 | 16.0 | 5.2 | Excellent | Good |
| Sample 23 | | 1.6 | 4.0 | 2.5 | 0.5 | 0.3 | Fair | Good |
| Sample 24 | | 1.6 | 4.0 | 2.5 | 1.5 | 0.9 | Fair | Good |
| Sample 25 | | 1.6 | 4.0 | 2.5 | 4.0 | 2.5 | Excellent | Good |
| Sample 26 | | 1.6 | 4.0 | 2.5 | 8.0 | 5.0 | Excellent | Good |
| Sample 27 | | 1.6 | 4.0 | 2.5 | 16.0 | 10.0 | Excellent | Good |
| Sample 28 | | 0.5 | 4.0 | 8.0 | 4.0 | 8.0 | Excellent | Good |
| Sample 29 | | 0.5 | 4.0 | 8.0 | 8.0 | 16.0 | Excellent | Good |
| Sample 30 | | 0.5 | 4.0 | 8.0 | 16.0 | 32.0 | Excellent | Good |
| Sample 31 | | 1.6 | 12.8 | 8.0 | 4.0 | 2.5 | Excellent | Good |
| Sample 32 | | 1.6 | 12.8 | 8.0 | 8.0 | 5.0 | Excellent | Good |

TABLE 3-continued

| | Plating | First-stage | | | Second-stage | Second-stage/ first-stage | Stacking bonding | Stacking short circuit |
|---|---|---|---|---|---|---|---|---|
| | type | T2 (μm) | T4 (μm) | T4/T2 | T42 (μm) | T42/T2 | strength | rate |
| Sample 33 | | 1.6 | 12.8 | 8.0 | 16.0 | 10.0 | Excellent | Good |
| Sample 34 | | 1.6 | 24.0 | 15.0 | 0.5 | 0.3 | Fair | Good |
| Sample 35 | | 1.6 | 24.0 | 15.0 | 1.5 | 0.9 | Fair | Good |
| Sample 36 | | 1.6 | 24.0 | 15.0 | 4.0 | 2.5 | Excellent | Good |
| Sample 37 | | 1.6 | 24.0 | 15.0 | 8.0 | 5.0 | Excellent | Good |
| Sample 38 | | 1.6 | 24.0 | 15.0 | 16.0 | 10.0 | Excellent | Good |
| Sample 39 | | 0.5 | 7.5 | 15.0 | 0.5 | 1.0 | Fair | Good |
| Sample 40 | | 0.5 | 7.5 | 15.0 | 4.0 | 8.0 | Excellent | Good |
| Sample 41 | | 0.5 | 7.5 | 15.0 | 8.0 | 16.0 | Excellent | Good |
| Sample 42 | | 0.5 | 7.5 | 15.0 | 16.0 | 32.0 | Excellent | Good |

(Overall Evaluation of Evaluation 3)

From the results of the samples 19 to 42 in Table 3, it could be confirmed that the short circuit rate was less than a reference value in the samples of any level, and a fillet having an appropriate shape was formed and mounted. On the other hand, in the stacking bonding strength test, regarding samples in which a value of T42/T2 was less than 1.3 (sample 23, sample 24, sample 34, sample 35, and sample 39), the ratio of those in which the bonding between the first-stage electronic component 920*a* and the second-stage electronic component 920*b* is released earlier than the bonding between the mounting substrate and the first-stage electronic component 920*a* was large. In the samples in which the value of T42/T2 is less than 1.3, the bonding strength between the first-stage electronic component 920*a* and the second-stage electronic component 920*b* tends to be insufficient, and it is considered that sufficient bonding strength is ensured by setting the value of T42/T2 to be 1.3 or more.

<Evaluation 4>

In Evaluation 4, evaluation was performed on problems that may occur in manufacturing processes of the electronic component structure 710 according to the second comparative example and the electronic component structure 910 according to the third embodiment. That is, in Evaluation 4, in the same manner as in the case where the electronic component structure 710 and the electronic component structure 910 were prepared in Evaluation 1, the electronic component structure 910 stacked in two stages was prepared, and problems that may occur in a process of bonding the first-stage electronic components 720*a* and 920*a* and the second-stage electronic components 720*b* and 920*b* were evaluated.

(Sample 43)

In the sample 43, one hundred samples were prepared for an electronic component structure 710 having the same level as that of the electronic component structure 710 prepared as the sample 02 in Evaluation 1. That is, in the sample 43, two electronic components 120 in which a thickness T2*n* of the surface electrode layer 126*c* along the second reference line SL2 and a thickness T4*n* of the surface electrode layer 126*c* along the fourth reference line SL4 were both 4.0 μm were bonded to each other to prepare the electronic component structure 710.

(Sample 44 to Sample 49)

In the samples 44 to 49, one hundred samples were prepared for an electronic component structure 910 having the same level as that of the electronic component structure 910 prepared as the samples 03 to 07 in Evaluation 1. In the samples 44 to 49, the thicknesses T2*n* (T2 and T22) of the surface electrode layers 26*c* and 926*c* along the second reference line SL2 were 3.1 μm, 1.6 μm, 0.5 μm, 1.6 μm, 1.6 μm, and 0.5 μm, respectively, and the thicknesses T4*n* (T4 and T42) of the surface electrode layers 26*c* and 926*c* along the fourth reference line SL4 were 4.0 μm, 4.0 μm, 4.0 μm, 12.8 μm, 24.0 μm, and 7.5 μm, respectively.

(Evaluation Method for Each Sample)

In a process of bonding the first-stage electronic components 720*a* and 920*a* and the second-stage electronic components 720*b* and 920*b* in a manufacturing process of each sample, a stacking defect rate, which is a ratio of an occurrence of stacking defective products, was calculated. Here, the process of bonding the first-stage electronic components 720*a* and 920*a* and the second-stage electronic components 720*b* and 920*b* was performed by (1) disposing the first-stage electronic components 720*a* and 920*a*, (2) picking up and conveying the second-stage electronic components 720*b* and 920*b* to place and stack the second-stage electronic components 720*b* and 920*b* on the first-stage electronic components 720*a* and 920*a*, and (3) conveying the stacked first-stage electronic components 720*a* and 920*a* and second-stage electronic components 720*b* and 920*b* to a heat treatment furnace and performing heat treatment.

In Evaluation 4, in the prepared electronic component structures 710 and 910, according to an appearance inspection, those in which the second-stage electronic components 720*b* and 920*b* were bonded on the first-stage electronic components 720*a* and 920*a* in an appropriate posture were evaluated as good stacking products. In contrast, in Evaluation 4, according to the appearance inspection, those in which the second-stage electronic components 720*b* and 920*b* were bonded in a posture inclined with respect to the first-stage electronic components 720*a* and 920*a* or the second-stage electronic components 720*b* and 920*b* dropped from the first-stage electronic components 720*a* and 920*a* during the process were evaluated as defective stacking products. In Evaluation 4, for each sample (one hundred samples), a ratio of the number of defective stacking products in the prepared samples was calculated as a stacking defect rate. Results are shown in Table 4.

TABLE 4

| | Plating type | T2n (μm) | T4n (μm) | T4n/T2n | Stacking defect rate |
|---|---|---|---|---|---|
| Sample 43 | Sn | 4.0 | 4.0 | 1.0 | 30% |
| Sample 44 | | 3.1 | 4.0 | 1.3 | 5% |
| Sample 45 | | 1.6 | 4.0 | 2.5 | 0% |
| Sample 46 | | 0.5 | 4.0 | 8.0 | 0% |
| Sample 47 | | 1.6 | 12.8 | 8.0 | 0% |

TABLE 4-continued

| | Plating type | T2n (μm) | T4n (μm) | T4n/T2n | Stacking defect rate |
|---|---|---|---|---|---|
| Sample 48 | | 1.6 | 24.0 | 15.0 | 0% |
| Sample 49 | | 0.5 | 7.5 | 15.0 | 0% |

(Overall Evaluation of Evaluation 4)

As shown in Table 4, in the sample 43 in which T4$n$/T2$n$ was 1.0, 30% of defective stacking products occurred. In contrast, in the sample 44 in which T4$n$/T2$n$ was 1.3, the stacking defect rate was improved to 5%, and in the samples 45 to 49 in which T4$n$/T2$n$ was 2.5 to 15.0, the stacking defect rate was improved to 0%. In the samples 44 to 45, since the centers of gravity of the electronic components 920$a$ and 920$b$ included in the electronic component structure 910 are lower than that in the sample 43, it is considered that stability in a stacked state is high and the number of defective stacking products is small.

<Evaluation 5>

In Evaluation 5, a three-stage stacked electronic component structure and a five-stage stacked electronic component structure were prepared, then the electronic component structures were mounted on the mounting substrate by the reflow method, and whether collapse of the electronic component structures occurred during mounting on the mounting substrate was evaluated.

(Sample 50)

In the sample 50, one hundred samples were prepared for the electronic component structures in which the electronic components 120 prepared as the sample 02 in Evaluation 1 were stacked in three stages and five stages. In the sample 50, three or five electronic components in which the thickness T2$n$ of the surface electrode layer 126$c$ along the second reference line SL2 and the thickness T4$n$ of the surface electrode layer 126$c$ along the fourth reference line SL4 were both 4.0 μm were bonded to one another to prepare the electronic component structure.

(Sample 51 to Sample 56)

In the samples 51 to 56, an electronic component structure 910, which was different from the electronic component structures 910 prepared as the samples 03 to 07 in Evaluation 1 only in the number of stacked electronic components but was otherwise similar to the electronic component structures 910, was prepared. With respect to each sample, one hundred samples were prepared for each of the three-stage stacked electronic component structure 910 and the five-stage stacked electronic component structure 910. In the samples 51 to 56, the thicknesses T2$n$ (including T2) of the surface electrode layers 26$c$, 926$c$, 927$c$, and 928$c$ along the second reference line SL2 were 3.1 μm, 1.6 μm, 0.5 μm, 1.6 μm, 1.6 μm, and 0.5 μm, respectively, and the thicknesses T4$n$ (including T4) of the surface electrode layers 26$c$, 926$c$, 927$c$, and 928$c$ along the fourth reference line SL4 were 4.0 μm, 4.0 μm, 4.0 μm, 12.8 μm, 24.0 μm, and 7.5 μm, respectively. One electronic component structure 910 is formed of electronic components having the same thicknesses T2 and T4.

(Evaluation Method for Each Sample)

The electronic component structures which are samples forming each sample were prepared, then the electronic component structures were mounted on the mounting substrate by the reflow method, and the number of samples in which collapse of the electronic component structures occurred during mounting on the mounting substrate was measured according to the appearance inspection. As for a mounting collapse rate, a ratio of the number of samples in which collapse of the electronic component structures occurred to all the samples arranged on the mounting substrate was calculated for the three-stage stacked electronic component structure and the five-stage stacked electronic component structure of each level. Results are shown in Table 5.

TABLE 5

| | Plating type | T2n (μm) | T4n (μm) | T4n/T2n | Three-stage stacking Mounting collapse rate | Five-stage stacking Mounting collapse rate |
|---|---|---|---|---|---|---|
| Sample 50 | Sn | 4.0 | 4.0 | 1.0 | 20% | 30% |
| Sample 51 | | 3.1 | 4.0 | 1.3 | 5% | 10% |
| Sample 52 | | 1.6 | 4.0 | 2.5 | 0% | 0% |
| Sample 53 | | 0.5 | 4.0 | 8.0 | 0% | 0% |
| Sample 54 | | 1.6 | 12.8 | 8.0 | 0% | 0% |
| Sample 55 | | 1.6 | 24.0 | 15.0 | 0% | 0% |
| Sample 56 | | 0.5 | 7.5 | 15.0 | 0% | 0% |

(Overall Evaluation of Evaluation 5)

As shown in Table 5, in the sample 50 in which T4$n$/T2$n$ was 1.0, 20% of mounting collapse occurred in the three-stage stacked electronic component structure and 30% of mounting collapse occurred in the five-stage stacked electronic component structure. In contrast, in the sample 51 in which T4$n$/T2$n$ was 1.3, the mounting collapse rate decreased to 5% in the three-stage stacked electronic component structure and 10% in the five-stage stacked electronic component structure, and in the samples 52 to 56 in which T4$n$/T2$n$ was 2.5 to 15.0, the mounting collapse rate was improved to 0% in both the three-stage stacked electronic component structure and the five-stage stacked electronic component structure. In the samples 51 to 56, since the center of gravity of the electronic component structure 910 is lower than that of the sample 50, it is considered that the mounting collapse was less likely to occur.

<Evaluation 6>

In Evaluation 6, similarly to Evaluation 5, a three-stage stacked electronic component structure 910 was prepared, then the three-stage stacked electronic component structure 910 was mounted on the mounting substrate by the reflow method, and whether collapse of the electronic component structure 910 occurred during mounting on the mounting substrate was evaluated. However, unlike Evaluation 5, in Evaluation 6, three electronic components included in one electronic component structure 910 were formed by electronic components having different thicknesses T2 and T4.

(Sample 57 to Sample 59)

In the samples 57 to 59, the three electronic components included in the one electronic component structure 910 were prepared in the same manner as the three-stage stacked electronic component of the samples 51 to 56 in Evaluation 5 except that the electronic components were formed by electronic components having different thicknesses T2 and T4.

(Evaluation Method for Each Sample)

In Evaluation 6, the mounting collapse rate of each sample was calculated in the same manner as in Evaluation 5. Results are shown in Table 6.

TABLE 6

| | | First-stage | | | Second-stage | | | Uppermost-stage (third stage) | | | First-stage/ third-stage | Three-stage stacking |
|---|---|---|---|---|---|---|---|---|---|---|---|---|
| | Plating type | T2 (μm) | T4 (μm) | T41/ T21 | T22 (μm) | T42 (μm) | T42/ T22 | T2max (μm) | T4max (μm) | T4max/ T2max | T4/ T2max | Mounting collapse rate |
| Sample 57 | Sn | 3.1 | 4.0 | 1.3 | 1.6 | 4.0 | 2.5 | 0.5 | 4.0 | 8.0 | 8.0 | 0% |
| Sample 58 | | 1.6 | 12.8 | 8.0 | 1.6 | 24.0 | 15.0 | 0.5 | 7.5 | 15.0 | 25.6 | 0% |
| Sample 59 | | 1.6 | 24.0 | 15.0 | 1.6 | 12.8 | 8.0 | 1.6 | 4.0 | 2.5 | 15.0 | 0% |

(Overall Evaluation of Evaluation 6)

In all of the samples 52 to 56 in which the electronic component structure 910 was formed by combining the electronic components in which T4*n*/T2*n* (including T4/T2, T42/T22, and T4max/T2max) was 2.5 to 15.0, the mounting collapse rate was 0%. In the electronic component structure 910 according to the samples, since the center of gravity was low, it is considered that mounting collapse did not occur. In addition, in the electronic component structure 910 according to the samples, a value of T4/T2max was larger than 1, and a condition of the expression (6) was satisfied.

Although characteristics of the electronic component and the electronic component structure according to the present disclosure have been described with reference to the embodiments and the examples, the electronic component and the electronic component structure are not limited only to the embodiments and the examples, and it is needless to say that the electronic component and the electronic component structure include many other embodiments and modifications. For example, the electronic component structure is not limited to a structure in which electronic components are stacked in a row, and a structure in which electronic components are stacked in a plurality of rows (a structure including a plurality of first-stage electronic components) is also a type of the electronic component structure according to the present disclosure.

The electronic components 20, 220, 320, 420, and 520, and the electronic components 620*a*, 620*b*, 820*a*, 820*b*, 820max, 920*a*, 920*b*, 920*n*, and 920max included in the electronic component structures 610, 810, and 910 are not limited to capacitors, and may be inductors, varistors, or the like, or may be a combination thereof.

REFERENCE SIGNS LIST

20, 120, 220, 320, 420, 520 electronic component
620*a*, 720*a*, 820*a*, 920*a* first-stage electronic component
620*b*, 720*b*, 820*b*, 920*b* second-stage electronic component
920*n* nth-stage electronic component
820max, 920max uppermost-stage electronic component
610, 710, 810, 910 electronic component structure
21 element body portion
21*a* end surface
21*b* end surface
21*c* center
21*d* element body lower surface
21*e* element body upper surface
22 internal electrode layer
23 dielectric layer
26, 126, 226, 326, 426, 526, 626, 926, 927, 928 terminal electrode portion
26*a*, 326*a*, 426*a*, 526*a* base electrode layer
26*b*, 326*b*, 426*b*, 526*b* intermediate electrode layer
26*c*, 126*c*, 226*c*, 326*c*, 426*c*, 526*c*, 626*c*, 926*c*, 927*c*, 928*c* surface electrode layer
T4, T2 thickness
SL1 first reference line
SL2 second reference line
SL3 third reference line
SLA fourth reference line
SL5 fifth reference line
82 mounting substrate
83, 183, 683, 783 solder fillet

What is claimed is:

1. An electronic component, comprising:

an element body portion having a substantially rectangular parallelepiped shape, and a terminal electrode portion formed on each of a pair of end surfaces of the element body portion, wherein the terminal electrode portion includes a base electrode layer that is in direct contact with at least one of the pair of end surfaces and a surface electrode layer that covers the base electrode layer and constitutes an outermost surface of the terminal electrode portion, in a cross section passing through a center of the element body portion and perpendicular to an element body lower surface and the end surfaces of the element body portion, a thickness of the surface electrode layer changes continuously between the element body lower surface and a reference line that is parallel to the element body lower surface and passes through a height of half of the entire element body portion from the element body lower surface, and a relation between a thickness T2 of the surface electrode layer and a thickness T4 of the surface electrode layer satisfies $1.3 \leq T4/T2 \leq 15.0$, the thickness T2 being along a second reference line that is parallel to the element body lower surface and passes through a height of three quarters of the entire element body portion from the element body lower surface, and the thickness T4 being along a fourth reference line that is parallel to the element body lower surface and passes through a height of one quarter of the entire element body portion from the element body lower surface.

2. The electronic component according to claim 1, wherein the surface electrode layer contains Sn or Au.

3. The electronic component according to claim 1, wherein the surface electrode layer contains Sn, and the relation between the thickness T2 of the surface electrode layer along the second reference line and the thickness T4 of the surface electrode layer along the fourth reference line satisfies $2.5 \leq T4/T2 \leq 15.0$.

4. The electronic component according to claim 1, wherein the surface electrode layer contains Au, and the relation between the thickness T2 of the surface electrode layer along the second reference line and the thickness T4 of the surface electrode layer along the fourth reference line satisfies $2.5 \le T4/T2 \le 8.0$.

5. An electronic component structure, comprising: a plurality of electronic components each including an element body portion having a substantially rectangular parallelepiped shape, and a terminal electrode portion formed on each of a pair of end surfaces of the element body portion, the terminal electrode portions of the respective electronic components being connected to each other, wherein at least one of the plurality of electronic components is a first-stage electronic component having an element body lower surface that does not face other electronic components, and in the first-stage electronic component, the terminal electrode portion includes a base electrode layer that is in direct contact with at least one of the pair of end surfaces and a surface electrode layer that covers the base electrode layer and constitutes an outermost surface of the terminal electrode portion, in a cross section passing through a center of the element body portion and perpendicular to the element body lower surface and the end surfaces of the element body portion, a thickness of the surface electrode layer changes continuously between a height at the element body lower surface and a reference line that is parallel to the element body lower surface and passes through a height of half of the entire element body portion from the element body lower surface, and a relation between a thickness T2 of the surface electrode layer and a thickness T4 of the surface electrode layer satisfies $1.3 \le T4/T2 \le 15.0$, the thickness T2 being along a second reference line that is parallel to the element body lower surface and passes through a height of three quarters of the entire element body portion from the element body lower surface, and the thickness T4 being along a fourth reference line that is parallel to the element body lower surface and passes through a height of one quarter of the entire element body portion from the element body lower surface.

6. The electronic component structure according to claim 5, wherein the surface electrode layer contains Sn, and the relation between the thickness T2 of the surface electrode layer along the second reference line and the thickness T4 of the surface electrode layer along the fourth reference line satisfies $2.5 \le T4/T2 \le 15.0$.

7. The electronic component structure according to claim 5, wherein at least one of the plurality of electronic components is a second-stage electronic component having an element body lower surface facing an element body upper surface of the first-stage electronic component, the terminal electrode portion in the second-stage electronic component includes a base electrode layer that is in direct contact with at least one of the end surfaces and a surface electrode layer that covers the base electrode layer and constitutes an outermost surface of the terminal electrode portion, and in a cross section passing through a center of the element body portion in the second-stage electronic component and perpendicular to the element body lower surface and the end surfaces of the element body portion, a relation between a thickness T42 of the surface electrode layer and the thickness T2 of the surface electrode layer satisfies $1.3 \le T42/T2 \le 32$, the thickness T42 being along the fourth reference line that is parallel to the element body lower surface and passes through a height of one quarter of the entire element body portion from the element body lower surface, and the thickness T2 being along the second reference line in the first-stage electronic component.

8. The electronic component structure according to claim 5, wherein at least one of the plurality of electronic components is an nth-stage electronic component having an element body lower surface facing any one of other electronic components, and in the nth-stage electronic component, the terminal electrode portion includes a base electrode layer that is in direct contact with at least one of the end surfaces and a surface electrode layer that covers the base electrode layer and constitutes an outermost surface of the terminal electrode portion, and in a cross section passing through a center of the element body portion and perpendicular to the element body lower surface and the end surfaces of the element body portion, a relation between a thickness $T2n$ of the surface electrode layer and a thickness $T4n$ of the surface electrode layer satisfies $1.3 \le T4n/T2n \le 15.0$, the thickness $T2n$ being along the second reference line that is parallel to the element body lower surface and passes through a height of three quarters of the entire element body portion from the element body lower surface, and the thickness $T4n$ being along the fourth reference line that is parallel to the element body lower surface and passes through a height of one quarter of the entire element body portion from the element body lower surface.

9. The electronic component structure according to claim 8, wherein all electronic components other than the first-stage electronic component among the plurality of electronic components are the nth-stage electronic components.

10. The electronic component structure according to claim 5, wherein another one of the plurality of electronic components is an uppermost-stage electronic component having an element body upper surface that does not face other electronic components, the terminal electrode portion in the uppermost-stage electronic component includes a base electrode layer that is in direct contact with at least one of the end surfaces and a surface electrode layer that covers the base electrode layer and constitutes an outermost surface of the terminal electrode portion, and in a cross section passing through a center of the element body portion in the uppermost-stage electronic component and perpendicular to the element body lower surface and the end surfaces of the element body portion, a relation between a thickness T2max of the surface electrode layer and the thickness T4 of the surface electrode layer satisfies $T2max < T4$, the thickness T2max being along the second reference line that is parallel to the element body lower surface and passes through a height of one quarter of the entire element body portion from the element body lower surface, and the thickness T4 being along the fourth reference line in the first-stage electronic component.

* * * * *